US012447152B2

(12) United States Patent
Bhonde et al.

(10) Patent No.: US 12,447,152 B2
(45) Date of Patent: Oct. 21, 2025

(54) PHARMACEUTICAL COMBINATION OF PRMT5 INHIBITORS

(71) Applicant: Lupin Limited, Mumbai (IN)

(72) Inventors: Mandar Ramesh Bhonde, Pune (IN); Venkata P. Palle, Pune (IN); Rajender Kumar Kamboj, Pune (IN)

(73) Assignee: Lupin Limited, Mumbai (IN)

( * ) Notice: Subject to any disclaimer, the term of this patent is extended or adjusted under 35 U.S.C. 154(b) by 739 days.

(21) Appl. No.: 17/767,270

(22) PCT Filed: Oct. 22, 2020

(86) PCT No.: PCT/IB2020/059921
§ 371 (c)(1),
(2) Date: Apr. 7, 2022

(87) PCT Pub. No.: WO2021/079302
PCT Pub. Date: Apr. 29, 2021

(65) Prior Publication Data
US 2022/0395508 A1    Dec. 15, 2022

(30) Foreign Application Priority Data
Oct. 22, 2019   (IN) .............................. 201921042899

(51) Int. Cl.
| A61K 31/4439 | (2006.01) |
| A61K 31/444 | (2006.01) |
| A61K 31/454 | (2006.01) |
| A61K 31/502 | (2006.01) |
| A61K 31/5025 | (2006.01) |
| A61K 31/506 | (2006.01) |
| A61K 31/517 | (2006.01) |
| A61K 31/519 | (2006.01) |
| A61K 31/5377 | (2006.01) |
| A61K 31/55 | (2006.01) |
| A61P 35/00 | (2006.01) |

(52) U.S. Cl.
CPC .......... *A61K 31/519* (2013.01); *A61K 31/454* (2013.01); *A61K 31/502* (2013.01); *A61K 31/5025* (2013.01); *A61K 31/506* (2013.01); *A61K 31/517* (2013.01); *A61K 31/5377* (2013.01); *A61K 31/55* (2013.01); *A61P 35/00* (2018.01)

(58) Field of Classification Search
None
See application file for complete search history.

(56) References Cited

FOREIGN PATENT DOCUMENTS

| WO | 2011/077133 A2 | 6/2011 | |
| WO | 2011/079236 A1 | 6/2011 | |
| WO | 2014/100695 A1 | 6/2014 | |
| WO | 2014/100716 A1 | 6/2014 | |
| WO | 2014/100719 A2 | 6/2014 | |
| WO | 2014/100730 A1 | 6/2014 | |
| WO | 2014/100734 A1 | 6/2014 | |
| WO | 2014/128465 A1 | 8/2014 | |
| WO | 2014/145214 A2 | 9/2014 | |
| WO | 2015/198229 A1 | 12/2015 | |
| WO | 2015/200677 A2 | 12/2015 | |
| WO | 2015/200680 A2 | 12/2015 | |
| WO | 2016/022605 A1 | 2/2016 | |
| WO | 2016/034671 A1 | 3/2016 | |
| WO | 2016/034673 A1 | 3/2016 | |
| WO | 2016/034675 A1 | 3/2016 | |
| WO | 2016/038550 A1 | 3/2016 | |
| WO | 2016/089883 A1 | 6/2016 | |
| WO | 2016/135582 A1 | 9/2016 | |
| WO | WO-2016145150 A2 * | 9/2016 | ......... A61K 31/4439 |
| WO | 2016/178870 A1 | 11/2016 | |
| WO | WO-2017032840 A1 * | 3/2017 | ............. A61K 31/34 |
| WO | 2018/065365 A1 | 4/2018 | |
| WO | 2018/115380 A1 | 6/2018 | |
| WO | WO-2018100536 A1 * | 6/2018 | ........... A61K 31/415 |
| WO | 2019/032859 A1 | 2/2019 | |
| WO | 2019/051084 A1 | 3/2019 | |
| WO | WO-2019116302 A1 * | 6/2019 | ......... A61K 31/4709 |
| WO | WO-2020205867 A1 * | 10/2020 | ........... A61K 31/437 |

OTHER PUBLICATIONS

Golub et al., Science, vol. 286, Oct. 15, 1999, pp. 531-537 (Year: 1999).*
Janes et al., "Targeting KRAS Mutant Cancers with a Covalent G12C-Specific Inhibitor", Cell, Elsevier, Amsterdam NL, vol. 172, No. 3, Jan. 28, 2018 (Jan. 28, 2018), p. 578 (Year: 2018).*
Janssen Research & Development, LLC (Janssen Research & Development, LLC, First-in-Human Study of JNJ-74699157 in Participants With Tumors Harboring the KRAS G12C Mutationâ, NCT04006301 (First Posted Jul. 5, 2019) (Year: 2019).*
Hofmann et al., Abstract PL06-01: Discovery of BI-3406: A potent and selective SOS1::KRAS inhibitor opens a new approach for treating KRAS-driven tumors, Dec. 1, 2019 (Year: 2019).*
Balakrishna et al., Preclinical assessment of ulixertinib, a novel ERK1/2 inhibitor, ADMET & DMPK 5(4) (2017) 212-223) (Year: 2017).*
Pierre-Jacques Hamard et al.: "PRMT5 Regulates DNA Repair by Controlling the Alternative Splicing of Histone-Modifying Enzymes", Cell Reports, vol. 24, No. 10, Sep. 1, 2018, pp. 2643-2657.

(Continued)

*Primary Examiner* — Kortney L. Klinkel
*Assistant Examiner* — Alison Azar Salamatian
(74) *Attorney, Agent, or Firm* — The Dobrusin Law Firm, P.C.

(57) ABSTRACT

This disclosure relates to pharmaceutical combinations for treating and/or preventing cancer and methods and uses thereof. More particularly, provided are pharmaceutical combination comprising a PRMT5 Inhibitor and a cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator.

3 Claims, 10 Drawing Sheets

(56) References Cited

OTHER PUBLICATIONS

Shatha Abuhammad et al.: "Regulation PRMT5-MDM4 axis is critical in the response to CDK4/6 inhibitors in melanoma", Proceedings of the National Academy of Sciences, vol. 116, No. 36, Aug. 22, 2019, pp. 17990-18000.
Zhu Fen et al.: "PRMT5 is upregulated by B-cell receptor signaling and forms a positive-feedback loop with PI3K/AKT in lymphoma cells,", Blood Cancer Journal, Nature Publishing Group UK, London, vol. 33, No. 12, May 23, 2019, pp. 2898-2911.
Hong Lin et al.: "Nucleoside protein arginine methyltransferase 5 (PRMT5) inhibitors", Biorganic & Medicinal Chemistry Letters, vol. 29, No. 11, Jun. 1, 2019, pp. 1264-1269.
James, Matthew R. et al.: "Targeting KRAS Mutant Cancers with a Covalent G12C-Specific Inhibitor", Cell, Elsevier, Amsterdam NL, vol. 172, No. 3, Jan. 28, 2018, p. 578.
ACS Medicinal Chemistry Letters Jun. 2015, p. 408.
PCT International Search Report & Written Opinion dated Feb. 3, 2021 (PCT/IB2020/059921).

\* cited by examiner

PHARMACEUTICAL COMBINATION OF PRMT5 INHIBITORS

CROSS-REFERENCE TO RELATED APPLICATIONS

This PCT Application claims priority in and to Indian Provisional Patent Application No. 201921042899 filed Oct. 22, 2019, the contents of which are hereby incorporated by reference herein in their entirety.

All references, including, but not limited to, patents, patent applications, non-patent references, and products cited within this PCT Application and their disclosures are hereby incorporated by reference herein in their entirety.

FIELD

The invention is related to a pharmaceutical combination for treating cancer. Particularly, this invention is related to a pharmaceutical combination comprising a combination of a Protein Arginine N-Methyltransferase 5 (PRMT5) inhibitor of Formula (I), and at least one targeted agent/cellular activity modulator selected from an EGFR inhibitor, a KRAS inhibitor, a KRAS-G12C inhibitor, a MEK inhibitor, a Bcl-2 inhibitor, a SOS inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator, wherein the PRMT5 Inhibitor is compound of Formula (I),

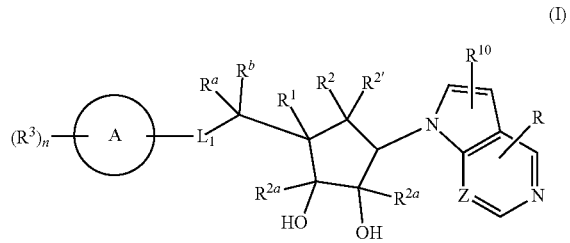

its tautomeric form, its stereoisomer, its pharmaceutically acceptable salt, their polymorph, or solvate thereof, for use in the treatment and/or prevention of cancer.

BACKGROUND

Methylation of proteins is a common post-translational modification that affects the protein's activity and its interaction with other biological molecules. N-methylation typically occurs on the nitrogen atoms of arginine, lysine and histidine residues and there are different families of enzymes that catalyze the methylation reaction, each being specific to the amino acid residue that will be methylated.

A family of 9 enzymes, called Protein Arginine N-Methyltransferases (PRMTs), are responsible for the methylation of the guanidinium group of arginine. The guanidinium group of arginine bears two (2) terminal nitrogen atoms that undergo monomethylation or dimethylation. Depending on the type of dimethylation, the enzymes are further classified as type I or type II. Type I PRMTs catalyse the monomethylation or the asymmetric dimethylation whereas type II enzymes catalyse the symmetric dimethylation. Some of the substrates that undergo methylation are histones, Sm ribonucleoproteins, MRE11 and p53 binding protein 1.

The methylation of arginine sidechains has an important role to play in various cell functions that include transcription activation as well as transcription repression, mRNA translation, pre-mRNA splicing, protein trafficking and signal transduction. It also occurs on myriad substrates. The enzymatic activity of the PRMTs hence affects cellular processes like cell proliferation, repair of damaged DNA as well as cell cycle and cell death. It has been shown that PRMT enzyme-mediated hypermethylation leads to certain disease conditions like cancer (Nature Reviews Cancer 2013, 13, p 37; Cellular and Molecular Life Sciences 2015, 72, p 2041; Trends in Biochemical Sciences 2011, 36, p 633).

At present, the most studied type II enzyme is PRMT5, which is conserved across the eukaryotic organisms. Overexpression of PRMT5 is linked with carcinogenesis and decreased patient survival in several human malignancies (Cell Mol Life Sci., 2015, 72, p 2041). PRMT5 directly interacts with proteins often dysregulated or mutated in cancers, hence a putative oncogene (Mol Cell Biol, 2008, 28, p 6262). PR. MTS mediated transcriptional repression of tumor suppressor genes like p53, RB-1, ST7, or upregulation of Cyclin D1, CDK4, CDK6, eLF4E, MITF, FGFR3 associate with the oncogenesis in both solid tumors and hematological malignancies. PRMT5 is located in the nucleus as well as the cytoplasm and its overexpression has been linked to a wide range of cancers including, but not limited to, glioblastoma multiforme (Oncogene, 2017, 36, p 263), prostate cancer (Oncogene, 2017, 36, p 1223), and pancreatic cancer (Science, 2016, 351, p 1214), mantle cell lymphoma (Nature Chemical Biology, 2015, 11, p 432), non-Hodgkin's lymphomas and diffuse large B-cell lymphoma (Journal of Biological Chemistry, 2013, 288, p 35534), acute myeloid leukemia (Leukemia, 2018, 32, p 499), acute lymphoblastic leukemia (AACR; Cancer Research 2017; 77(13 Suppl): Abstract nr 1128), multiple myeloma (Leukemia, 2018, 32, p 996), non-small cell lung cancer (The Biochemical Journal, 2012, 446, p 235), small cell lung cancer (AACR; Cancer Research 2017; 77(13 Suppl): Abstract nr DDT02-04), breast cancer (Cell Reports, 2017, 21, p 3498), triple negative breast cancer (AACR; Cancer Res 2015; 75(15 Suppl): Abstract nr 4786), gastric cancer (International Journal of Oncology, 2016, 49, p 1195), colorectal cancer (Oncotarget, 2015, 6, p 22799), ovarian cancer (J Histochem Cytochem 2013, 61, p 206), bladder cancer (Clinical Cancer Research, 2018, CCR-18-1270), hepatocellular cancer (Oncology Reports, 2018, 40, p 536), melanoma (PLoS One, 2013, 8, e74710; J Clin Invest. 2018, 128, p 517), sarcoma (Oncology Letters, 2018, 16, p 2161), oropharyngeal squamous cell carcinoma (Oncotarget, 2017, 8, p 14847), chronic myelogenous leukemia (J Clin Invest, 2016, 126, p 3961), epidermal squamous cell carcinoma (Carcinogenesis, 2017, 38, p 827), nasopharyngeal carcinoma (Oncology Reports, 2016, 35, p 1703), neuroblastoma (Molecular Oncology, 2015, 9, p 617), endometrial carcinoma (Gynecol Oncol., 2016, 140, p 145), cervical cancer (Pharmazie, 2018, 73, p 269). These findings have led to further research which show that inhibiting PRMT5 reduces cell proliferation (Molecular and Cellular Biology 2008, 28, p 6262. The Journal of Biological Chemistry 2013, 288, p 35534).

Inhibitors of arginine methyltransferases were first disclosed in 2004 by Cheng et al in the Journal of Biological Chemistry—Vol. 279 (23), p. 23892. Since then, various other compounds and substances having greater selectivity towards either type I or type II arginine methyltransferases have been disclosed. Other publications that disclose small molecules as inhibitors in relation to PRMT5 are: PCT International Application Publication Nos, WO2011077133, WO2011079236, WO201410005, WO2014100716, WO2014100719, WO2014100730, WO2014100734, WO2014128465, WO2014145214, WO2015200677, WO2015200680, WO2015198229, WO2016022605, WO2016034671, WO2016034673, WO2016034675, WO2016038550, WO2016135582, WO2016145150, WO2016178870, WO2018065365, WO2019032859, WO2016089883 and WO2017032840 and ACS Medicinal Chemistry Letters 2015, 6, p 408 Cell reports 2018, 24(10), p 2643-2657; Proceedings of the National Academy, 2019, 116(36), p 17990-18000; Blood Cancer Journal 2019, 33(12), p 2898-2911 and Biorganic & Medicinal Chemistry Letters, 2019, 29(11), p 1264-1269. Other publications that describes cellular activity modulators are WO2018115380; WO2019051084; Cell Elsevier, 2018,172(3), p 578.

However, there is a need to identify improved pharmaceutical composition or methods to treat or prevent cancer in a subject in need thereof.

SUMMARY

The inventions described and claimed herein have many attributes and aspects including, but not limited to, those set forth or described or referenced in this Summary. It is not intended to be all-inclusive and the inventions described and claimed herein are not limited to or by the features or embodiments identified in this Summary, which is included for purposes of illustration only and not restriction.

In consideration of the above problems, in accordance with one aspect disclosed herein, the invention relates to a pharmaceutical combination comprising a combination of a PRMT5 inhibitor of Formula (I), and at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK416 inhibitor, a MALT1 inhibitor, a BTK inhibitor, MAT2A inhibitor, a PT3K inhibitor, a AKT inhibitor, a BTK inhibitor, MAT2A inhibitor, a PI3K inhibitor, a AKT inhibitor, a FGFR inhibitor, a Type 1 PRMT inhibitor, a STING agonist, or an immune checkpoint inhibitor/modulator, wherein the PRMT5 inhibitor is compound Formula (I),

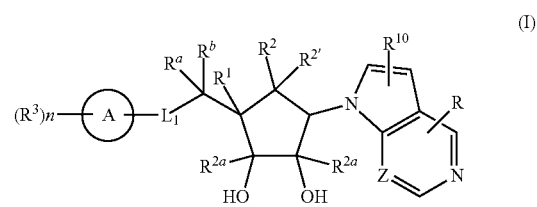

its tautomeric form, its stereoisomer, its pharmaceutically acceptable salt, their polymorph, or solvate thereof, for use in the treatment and/or prevention of cancer.

In an accordance with an aspect disclosed herein, a pharmaceutical combination for treating and/or preventing cancer in a subject, the pharmaceutical combination comprising a PRMT5 inhibitor of Formula (I), its stereoisomer, or its pharmaceutically acceptable salt thereof, and at least one targeted agent/cellular activity modulator, selected from an EGFR inhibitor, a KRAS inhibitor, a KRAS-G12C inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitors BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator, wherein the compound Formula (I) is,

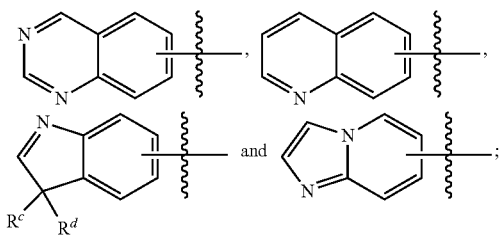

wherein,
$L_1$ is selected from —$CR^aR^b$—, —$NR^a$—, S, and O;
Z=CH or N;
$R^a$ and $R^b$ are independently selected at each occurrence from hydrogen, substituted or unsubstituted alkyl, and substituted or unsubstituted cycloalkyl;
ring A is selected from,

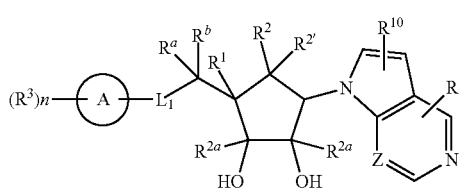

$R^c$ and $R^d$ are selected from substituted or unsubstituted alkyl or together with the carbon atoms to which they are attached form a $C_3$-$C_6$ cycloalkyl ring;
R is selected from —$NR^4R^5$, hydrogen, halogen, substituted or unsubstituted alkyl, substituted or unsubstituted alkoxy, substituted or unsubstituted heteroaryl and substituted or unsubstituted cycloalkyl;
$R^1$ and $R^2$ together with the carbon atoms to which they are attached form a bond in order to form a —C≡C—; or $R^1$ and $R^2$ together with the carbon atoms to which they are attached form a cyclopropane ring;
$R^{2'}$ and $R^{2a}$ which may be same or different and are independently selected from hydrogen and substituted or unsubstituted alkyl;
$R^3$ is independently selected at each occurrence from halogen, cyano, nitro, substituted or unsubstituted alkyl, —$OR^6$, —$NR^7R^8$, substituted or unsubstituted cycloalkyl, —C(O)OH, —C(O)O-alkyl. —C(O)$R^9$, —C(O)$NR^7R^8$, —$NR^7C(O)R^9$, substituted or unsubstituted aryl, substituted or unsubstituted heteroaryl, and substituted or unsubstituted heterocyclyl;
$R^4$ and $R^5$ are independently selected from hydrogen, substituted or unsubstituted alkyl, and substituted or unsubstituted cycloalkyl;
$R^6$ is selected from hydrogen, substituted or unsubstituted alkyl, and substituted or unsubstituted cycloalkyl;
$R^7$ and $R^8$ are independently selected from hydrogen, substituted or unsubstituted alkyl, and substituted or unsubstituted cycloalkyl;

R⁹ is selected from substituted or unsubstituted alkyl and substituted or unsubstituted cycloalkyl;

R¹⁰ is selected from hydrogen, halogen, and substituted or unsubstituted alkyl;

'n' is an integer ranging from (1 to 4, both inclusive);

when an alkyl group is substituted, it is substituted with 1 to 4 substituents independently selected from oxo (=O), halogen, cyano, cycloalkyl, aryl, heteroaryl, heterocyclyl, —OR$^{7a}$, —C(=O)OH, C(=O)O(alkyl), —NR$^{8a}$R$^{8b}$, —NR$^{8a}$C(=O)R$^{9a}$, and —C(=O)NR$^{8a}$R$^{8b}$;

when the heteroaryl group is substituted, it is substituted with 1 to 4 substituents independently selected from halogen, nitro, cyano, alkyl, haloalkyl, perhaloalkyl, cycloalkyl, heterocyclyl, aryl, heteroaryl, —OR$^{7a}$, —NR$^{8a}$R$^{8b}$, —NR$^{7a}$C(=O)R$^{9a}$, —C(=O)R$^{9a}$, —C(=O)NR$^{8a}$R$^{8b}$, —SO₂-alkyl, —C(O)OH, and —C(O)O-alkyl;

when the heterocycle group is substituted, it is substituted either on a ring carbon atom or on a ring hetero atom, and when it is substituted on a ring carbon atom, it is substituted with 1 to 4 substituents independently selected from oxo (=O), halogen, cyano, alkyl, cycloalkyl, perhaloalkyl, —OR$^{7a}$, —C(O)NR$^{8a}$R$^{8b}$, —C(=O)OH, —C(=O)O-alkyl, —N(H)C(=O)(alkyl), —N(H)R$^{8a}$, and —N(alkyl)₂; and when the heterocycle group is substituted on a ring nitrogen, it is substituted with substituents independently selected from alkyl, cycloalkyl, aryl, heteroaryl, —SO₂(alkyl), —C(O)R$^{9a}$, and —C(=O)O(alkyl); when the heterocycle group is substituted on a ring sulfur, it is substituted with 1 or 2 oxo (=O) group(s);

R$^{7a}$ is selected from hydrogen, alkyl, perhaloalkyl, and cycloalkyl;

R$^{8a}$ and R$^{8b}$ are each independently selected from hydrogen, alkyl, and cycloalkyl; and R$^{9a}$ is selected from alkyl and cycloalkyl.

In an accordance with another aspect disclosed herein, the PRMT5 Inhibitor of Formula (I) in the pharmaceutical combination is a compound selected from the group consisting of:

(1S,2R,5R)-3-(2-(2-Amino-3-bromoquinolin-7-yl)ethyl)-5-(4-amino-7H pyrrolo[2,3-d]pyrimidin-7-yl)cyclopent-3-ene-1,2-diol (Compound-1);

(1S,2R,5R)-3-(2-(2-amino-3-chloroquinolin-7-yl)ethyl)-5-(4-amino-7H-pyrrolo[2,3-d]pyrimidin-7-yl)cyclopent-3-ene-1,2-dial (Compound-2);

(1S,2R,5R)-3-(((2-(2-amino-3-bromoquinolin-7-yl)ethyl)-5-(4-amino-5-fluoro-7H-pyrrolo[2,3-d]pyrimidin-7-yl)cyclopent-3-ene-1,2-dial (Compound-3);

(1S,2R,5R)-5-(4-amino-7H-pyrrolo[2,3-d]pyrimidin-7-yl)-3-(((2-aminoquinolin-7-yl)thio)methyl)cyclopent-3-ene-1,2-diol (Compound-4);

(1S,2R,5R)-3-(((2-amino-3-chloroquinolin-7-yl)thio)methyl)-5-(4-amino-7H-pyrrolo[2,3-d]pyrimidin-7-yl)cyclopent-3-ene-1,2-diol (Compound-5);

(1S,2R,5R)-5-(4-amino-7H-pyrrolo[2,3-d]pyrimidin-7-yl)-3-(((2-aminoquinolin-7-yl)(methyl)amino)methyl)cyclopent-3-ene-1,2-diol (Compound-6);

(1S,2R,5R)-3-(1-(2-Amino-3-bromoquinolin-7-yl)propan-2-yl-5-(4-amino-7H-pyrrolo[2,3-d]pyrimidin-7-yl)cyclopent-3-ene-1,2-diol (Compound-7a and 7b);

(1S,2R,5R)-5-(4-Amino-7H-pyrrolo[2,3-d]pyrimidin-7-yl-3-(1-((2-(methylamino) quinolin-7-yl)oxy)ethyl)cyclopent-3-ene-1,2-diol (Compound-8a and 8b);

(1S,2R,5R)-3-(((2-amino-3-chloro-5-fluoroquinolin-7-yl)oxy)methyl)-5-(4-amino-7H-pyrrolo[2,3-d]pyrimidin-7-yl)-2-methylcyclopent-3-ene-1,2-diol (Compound-9);

(1S,1R,5R)-5-(4-amino-7H-pyrrolo[2,3-d]pyrimidin-7-yl)-3-(2-(2-(methylamino)quinolin-7-yl)ethyl)cyclopent-3-ene-1,2-diol (Compound-10);

(1S,2R,5R)-5-(4-amino-7H-pyrrolo[2,3-d]pyrimidin-7-yl)-3-(2-(3-methylimidazo[1,2-a]pyridin-7-yl)ethyl)cyclopent-3-ene-1,2-diol (Compound-11);

(1S,2R,5R)-3-(((2-amino-3-chloro-5-fluoroquinolin-7-yl)oxy)methyl)-5-(4-amino-7H-pyrrolo[2,3-d]pyrimidin-7-yl)-4-methylcyclopent-3-ene-1,2-diol (Compound-12);

(1S,2R,5R)-3-(2-(2-amino-3-chloro-5-fluoroquinolin-7-yl)ethyl)-5-(4-methyl-7H-pyrrolo[2,3-d]pyrimidin-7-yl)cyclopent-3-ene-1,2-diol (Compound-13);

(1S,2R,5R)-3-(2-(2-amino-3-chloro-5-fluoroquinolin-7 yl)ethyl)-5-(4-methyl-1H-pyrrolo[3,2-c]pyridin-1-yl)cyclopent-3-ene-1,2-diol hydrochloride (Compound-14);

(1S,2R,5R)-3-(2-(2-Amino-3-chloro-5-fluoroquinolin-7-yl)ethyl)-5-(1H-pyrrolo[3,2-c]pyridin-1-yl)cyclopent-3-ene-1,2-dial (Compound-15);

(1S,2R,5R) 3-(2-(2-amino-3-chloro-5-fluoroquinolin-7-yl)ethyl)-5-(7H-pyrrolo[2,3-d]pyrimidin-7-yl)cyclopent-3-ene-1,2-diol (Compound-16);

(1S,2R,5R)-5-(4-amino-7-yl-pyrrolo[2,3-d]pyrimidin-7-yl)-3-(((2-aminoquinolin-7-yl)amino)methyl)cyclopent-3-ene-1,2-diol (Compound-17), (1S,2R,5R)-3-(((2-amino-3-chloro-5-fluoroquinolin-7-yl)oxy)methyl)-5-(4-amino-7H-pyrrolo[2,3-d]pyrimidin-cyclopent-3-ene-1,2-diol (Compound-18);

(1S,2R,5R)-5-(4-amino-TH-pyrrolo[2,3-d]pyrimidin-7-yl)-3-(((2-(methylamino)quinolin-7-yl)oxy)methyl)cyclopent-3-ene-1,2-diol (Compound-19);

(1S,2R,5R)-3-(1-((2-amino-3-chloro-5-fluoroquinolin-7-yl)oxy)ethyl)-5-(4-amino-7H-pyrrolo[2,3-d]pyrimidin-7-yl)cyclopent-3-ene-1,2-diol (Compound-20a and 20b):

(1S,2R,5R)-3-(2-(2-amino-3-chloroquinolin-7-yl)ethyl)-5-(4-methyl-7H-pyrrolo[2,3-d]pyrimidin-7-yl)cyclopent-3-ene-1,2-diol (Compound-21);

(1S,2R,5R)-5-(4-Amino-7H-pyrrolo[2,3-d]pyrimidin-7-yl)-3-(2-(2-(cyclobutylamino) quinolin-7-yl)ethyl)cyclopent-3-ene-1,2-diol (Compound-22);

(1S,2R,5R)-3-(2-(2-Amino-3-fluoroquinolin-7-yl)ethyl)-5-(4-amino-7H-pyrrolo[2,3-d]pyrimidin-7-yl)cyclopent-3-ene-1,2-diol (Compound-23);

(1S,2R,5R)-3-(2-(2-amino-3-chloro-5-fluoroquinolin-7-yl)ethyl)-5-(4-amino-7H-pyrrolo[2,3-d]pyrimidin-7-yl)cyclopent-3-ene-1,2-diol (Compound-24);

(1S,2R,5R)-3-(2-(2-amino-3-chloro-6-fluoroquinolin-7-yl)ethyl)-5-(4-amino-7H-pyrrolo[2,3-d]pyrimidin-7-yl)cyclopent-3-ene-1,2-diol (Compound-25);

(1S,2R,5R) 3-(2-(2-amino-3-chloro-8-fluoroquinolin-7-yl)ethyl)-5-(4-amino-7H-pyrrolo[2,3-d]pyrimidin-7-yl)cyclopent-3-ene-1,2-diol (Compound-26);

(1S,2R,5R)-3-(2-(2-amino-3,3-dimethyl-3H-indol-6-yl)ethyl)-5-(4-amino-7H-pyrrolo[2,3-d]pyrimidin-7-yl)cyclopent-3-ene-1,2-diol (Compound-27):

(1S,2R,5R)-5-(4-amino-7H-pyrrolo[2,3-d]pyrimidin-7-yl)-3-(2-(2'-aminospiro[cyclobutane-1,3'-indol]-6'-yl)ethyl)cyclopent-3-ene-1,2-diol (Compound-28);

(1S,2R,5R)-3-(2-(2-amino-3,5-dichloroquinolin-7-yl)ethyl)-5-(4-amino-7H-pyrrolo[2,3-d]pyrimidin-7-yl)cyclopent-3-ene-1,2-diol (Compound-29);

(1S,2R,5R)-3-(2-(2-amino-3-chloroquinolin-7-ylethyl)-5-(2-amino-7H-pyrrolo[2,3-d]pyrimidin-7-yl)cyclopent-3-ene-1,2-diol (Compound-30);

(1S,2R,5R)-3-(2-(2-amino-3-chloro-5-fluoroquinolin-7-yl) ethyl)-5-(4-isopropyl-7H-pyrrolo[2,3-d]pyrimidin-7-yl) cyclopent-3-ene-1,2-diol (Compound-31);

(1S,2R,5R)-3-(2-(2-amino-3-chloro-5-fluoroquinolin-7-yl) ethyl)-5-(4-(1-methyl-1H-pyrrolo-4-yl)-7H-pyrrolo[2,3-d]pyrimidin-7-yl)cyclopent-3-ene-1,2-dial (Compound-32);

(1S,2R,5R)-3-(1-(2-amino-3-chloro-5-fluoroquinolin-7-yl) propan-2-yl)-5-(4-amino-7H-pyrrolo[2,3-d]pyrimidin-7-yl)cyclopent-3-ene-1,2-diol (Compound-33a and 33b):

(1S,2R,5R)-3-(1-(2-amino-3-chloroquinolin-7-yl)propan-2-yl)-5-(4-amino-7H-pyrrolo[2,3-d]pyrimidin-7-yl)cyclopent-3-ene-1,2-diol (Compound-34a and 34b);

(1S,2R,5R)-3-(1-(2-Amino-3-chloro-5-fluoroquinolin-7-yl) propan-2-yl)-5-(4-methyl-7H-pyrrolo[2,3-d]pyrimidin-7-yl)cyclopent-3-ene-1,2-dial (Compound-35a and 35b);

(1S,2R,5R)-3-(1-(2-amino-3-chloro-fluoroquinolin-7-yl) propan-2-yl)-2-methyl-5-(4-methyl-7H-pyrrolo[2,3-d] pyrimidin-7-yl)cyclopent-3-ene-1,2-diol (Compound-36a and 36b);

(1S,2R,5R)-3-(2-(2-amino-3-chloro-5-fluoroquinolin-7 yl)ethyl)-5-(4-amino-7H-pyrrolo[2,3-d]pyrimidin-7-yl)-2-methylcyclopent-3-ene-1,2-diol (Compound-37);

(1S,2R,5R)-3-(1-(2-amino-3-chloro-5-fluoroquinolin-7-yl) propan-2-yl)-5-(4-amino-7H-pyrrolo[2,3-d]pyrimidin-7-yl)-2 methylcyclopent-3-ene-1,2-diol (Compound-38):

(1S,2R,5R)-3-(2-(2-amino-3-chloro-5-fluoroquinolin-7 yl)ethyl)-2-methyl-5-(4-methyl-7H-pyrrolo[2,3-d]pyrimidin-7-yl)cyclopent-3-ene-1,2-dial (Compound-39);

(1S,2R,4R)-3-(2-(2-amino-3-choro-5-fluoroquinolin-7-yl) ethyl)-5-(4-amino-7H-pyrrolo[2,3-d]pyrimidin-7-yl)-2-ethylcyclopent-3-ene-1,2-diol (Compound-40);

(1S,2R,5R)-3-(2-(2-amino-3-chloro-5-fluoroquinolin-7-yl) ethyl)-5-(4-ethyl-7H-pyrrolo[2,3-d]pyrimidin-7-yl)cyclopent-3-ene-1,2-diol (Compound-41);

(1S,2R,5R)-3-(2-(2-amino-3-chloro-5-fluoroquinolin-7 yl)ethyl)-5-(4-cyclopropyl-7H-pyrrolo[2,3-d]pyrimidin-7-yl)cyclopent-3-ene-12-diol (Compound-42);

(1S,2R,5R)-3-(2-(2-Amino-bromo-5-fluoroquinolin-7-yl) ethyl)-5-(4-amino-7H-pyrrolo[2,3-d]pyrimidin-7-yl)cyclopent-3-ene-1,2-diol (Compound-43);

(1S,2R,5R) 3-(2-(2-Amino-3-bromo-5-fluoroquinolin-7-yl) ethyl)-5-(4-methyl-7H-pyrrolo[2,3-d]pyrimidin-7 yl)cyclopent-3-ene-1,2-diol (Compound-44);

(1S,2R,5R)-3-(1-(2-Amino-3-bromo-5-fluoro quinolin-7-yl) propan-2-yl)-5-(4-amino-7H-pyrrolo[2,3-d]pyrimidin-7-yl)cyclopent-3-ene-1,2-diol (Compound-45a and 45b);

(1S,2R,5R)-3-(2-(2-Amino-6-fluoroquinolin-7-yl)ethyl)-5-(4-amino-7H-pyrrolo[2,3-d]pyrimidin-7-yl)cyclopent-3-ene-1,2-diol (Compound-46);

(1S,2R,5R)-3-(2-(2-amino-5-fluoroquinolin-7-yl)ethyl)-5-(4-amino-7H-pyrrolo[2,3-d]pyrimidin-7-yl)cyclopent-3-ene-1,2-diol (Compound-47);

(1R,2R,3S,4R,5S)-1-(2-(2-Amino-3-chloro-5-fluoroquinolin-7-yl)ethyl)-4-(4-amino-7H-pyrrolo[2,3-d]pyrimidin-7-yl)bicyclo[3.1.0.]hexane-2,3-diol (Compound-48);

(1R,2R,3S,4R,5S)-4-(4-Amino-7H-pyrrolo[2,3-d]pyrimidin-7-yl)-1-(2-(2-(methylamino)quinolin-7-yl)ethyl)bicyclo[3.1.0]hexane-2,3-diol (Compound-49);

(1R,2R,3S,4R,5S)-4-(4-Amino-7H-pyrrolo[2,3-d]pyrimidin-7-yl)-1-(2-(2-(isopropylamino)quinolin-7-yl)ethyl) bicyclo[3.1.0]hexane-2,3-dial (Compound-50);

(1R,2R,3S,4R,5S)-4-(4-Amino-7H-pyrrolo[2,3-d]pyrimidin-7-yl)-1-(2-(2-(cyclobutylamino)quinolin-7-yl)ethyl) bicyclo[3.1.0]hexane-2,3-diol (Compound-51);

(1R,2R,3S,4R,5S)-4-(4-Amino-7H-pyrrolo[2,3-d]pyrimidin-7-yl)-1-(2-(2-((cyclopropylmethyl)amino) quinolin-7-yl)ethyl)bicyclo[3.1.0]hexane-2,3-diol (Compound-52);

(1R,2R,3S,4R,5S)-4-(4-Amino-7H-pyrrolo[2,3-d]pyrimidin-7-yl)-1-(2-(2-amino-8-fluoroquinolin-7-yl)ethyl)bicyclo[3.1.0]hexane-2,3-diol (Compound-53);

(1R,2R,3S,4R,5S)-1-(2-(2-Amino-3-methylquinolin-7-yl) ethyl)-4-(4-amino-7H-pyrrolo[2,3-d]pyrimidin-7-yl) bicyclo[3.1.0]hexane-2,3-diol (Compound-54);

(1R,2R,3S,4R,5S)-1-(2-(2-Amino-3-isopropyl quinolin-7-yl)ethyl)-4-(4-amino-7H-pyrrolo[2,3-d]pyrimidin-7-yl) bicyclo[3.1.0]hexane-2,3-diol (Compound-55);

(1R,2R,3S,4R,5S)-1-(2-(2-Amino-3-(1,1-di fluoroethyl) quinolin-7-yl)ethyl)-4-(4-amino-7H-pyrrolo[2,3-d]pyrimidin-7-yl)bicyclo[3.1.0]hexane-2,3-dial (Compound-56);

(1R,2R,3S,4R,5S)-1-(2-(2-Amino-3-cyclopropylquinolin-7-yl)ethyl)-4-(4-amino-7H-pyrrolo[2,3-d]pyrimidin-7-yl) bicyclo[3.1.0]hexane-2,3-diol (Compound-57);

(1R,2R,3S,4R,5S)-1-(2-(2-Amino-3-methoxyquinolin-7-yl) ethyl)-4-(4-amino-7H-pyrrolo[2,3-d]pyrimidin-7 yl)bicyclo[3.1.0]hexane-2,3-diol (Compound-58);

2-amino-7-(2-((1R,2R,3S,4R,5S)-4-(4-Amino-7H-pyrrolo [2,3-d]pyrimidin-7-yl)-2,3-dihydroxybicyclo[3.1.0] hexan-1 yl)ethyl)quinoline-3-carbonitrile (Compound-59);

(1R,2R,3S,4R,5S)-1-(2-(2-Amino-3-fluoroquinolin-7-yl) ethyl)-4-(4 amino-7H-pyrrolo[2,3-d]pyrimidin-7-yl)bicyclo[3.1.0]hexane-2,3-dial (Compound-60);

(1R,2R,3S,4R,5S)-1-(2-(2-Amino-3-chloroquinolin-7-yl) ethyl)-4-(4 amino-7H-pyrrolo[2,3-d]pyrimidin-7-yl)bicyclo[3.1.0]hexane-2,3-diol (Compound-61);

(1R,2R,3S,4R,5S)-1-(2-(2-Amino-3-chloro-6-fluoroquinolin-7-yl)ethyl)-4-(4-amino-7H-pyrrolo[2,3-d]pyrimidin-7-yl) bicyclo[3.1.0]hexane-2,3-diol (Compound-62);

(1R,2R,3S,4R,5S)-1-(2-(2-Amino-3-chloro-8-fluoroquinolin-7-yl)ethyl)-4-(4-amino-7H-pyrrolo[2,3-d]pyrimidin-7-yl)bicyclo[3.1.0]hexane-2,3-diol (Compound-63);

(1R,2R,3S,4R,5S)-1-(2-(2-amino-3-bromo-6-fluoroquinolin-7 yl)ethyl)-4-(4-amino-7H-pyrrolo[2,3-d]pyrimidin-7-yl)bicyclo[3.1.0]hexane-2,3-diol (Compound-64);

(1R,2R,3S,4R,5S)-4-(4-Amino-7H-pyrrolo[2,3-d]pyrimidin-7-yl)-1-(2-(3-methylimidazo[1,2-a]pyridin-7-yl) ethyl) bicyclo[3.1.0]hexane-2,3-diol (Compound-65);

(1R,2R,3S,4R,5S)-1-(2-(2-Amino-3,3-dimethyl-3H-indol-6-yl)ethyl-4-(4-amino-7H-pyrrolo[2,3-d]pyrimidin-7-yl) bicyclo[3.1.0]hexane-2,3-diol (Compound-66):

(1R,2R,3S,4R,5S)-1-(2-(2-Amino-3-chloro-5-fluoroquinolin-7-yl)ethyl)-4-(4-amino-6-methyl-7H-pyrrolo[2,3-d] pyrimidin-7-yl)bicyclo[3.1.0]hexane-2,3-diol (Compound-67);

(1R,2R,3S,4R,5S)-1-(2-(2-Amino-3-chloro-6-fluoroquinolin-7-yl)ethyl)-4-(4-amino-6-methyl-7H-pyrrolo[2,3-d] pyrimidin-7-yl)bicyclo[3.1.0]hexane-2,3-diol (Compound-68);

(1R,2R,3S,4R,5S)-1-(2-(2-amino-3-chloro-5-fluoroquinolin-7-yl)ethyl)-4-(4-methyl-7H-pyrrolo[2,3-d]pyrimidin-7-yl) bicyclo[3.1.0]hexane-2,3-diol (Compound-69);

(1R,2R,3S,4R,5S)-1-(2-(2-Amino-3-chloro-5-fluoroquinolin-7-yl)ethyl)-4-(7H-pyrrolo[2,3-d]pyrimidin-7-yl)bicyclo[3.1.0]hexane-2,3-diol (Compound-70);

(1R,2R,3S,4R,5S)-4-(4-Amino-7H-pyrrolo[2,3-d]pyrimidin-7-yl)-1-(2-(2'-aminospiro[cyclobutane-1,3'-indol]-6'-yl)ethyl)bicyclo[3.1.0]hexane-2,3-diol (Compound-71);

(1R,2R,3S,4R,5S)-1-(2-(2-Amino-3-bromo-5-fluoroquinolin-7-yl)ethyl)-4-(4-amino-7H-pyrrolo[2,3-d]pyrimidin-7-yl)bicyclo[3.1.0]hexane-2,3-diol (Compound-72);

(1R,2R,3S,4R,5S)-1-(2-(2-Amino-3-bromoquinolin-7-yl)ethyl)-4-(4-amino-7H-pyrrolo[2,3-d]pyrimidin-7-yl)bicyclo[3.1.0]hexane-2,3-diol (Compound-73);

(1R,2R,3S,4R,5S)-4-(4-Amino-7H-pyrrolo[2,3-d]pyrimidin-7-yl)-1-(2-(2-aminoquinolin-7-yl)ethyl)bicyclo[3.1.0]hexane-2,3-diol (Compound-74);

(1R,2R,3S,4R,5S)-4-(4-amino-7H-pyrrolo[2,3-d]pyrimidin-7-yl)-1-(2-(2-aminoquinazolin-7-yl)ethyl)bicyclo[3.1.0]hexane-2,3-diol (Compound-75);

(1S,2R,3S,4R,5S)-14(S)-1-(2-Amino-3-bromoquinolin-7-yl)propan-2-yl)-4-(4-amino-7H-pyrrolo[2,3-d]pyrimidin-7 yl)bicyclo[3.1.0]hexane-2,3-diol (Compound-76a and 76b);

(1S,4R,5S)-1-((S)-2-(2-Amino-3-chloro-5-fluoroquinolin-7-yl)-1-cyclopropylethyl)-4-(4-amino-7H-pyrrolo[2,3-d]pyrimidin-7-yl)bicyclo[3.1.0]hexane-2,3-dial (Compound-77a and 77b);

(1S,2R,3S,4R,5S)-1-(1-(2-Amino-3-chloro-5-fluoroquinolin-7 yl)propan-2-yl)-4-(4-amino-7H-pyrrolo[2,3-d]pyrimidin-7-yl)bicyclo[3.1.0]hexane-2,3-diol (Compound-78a and 78b);

(1R,2R,3S,4R,5S)-4-(4-Amino-7H-pyrrolo[2,3-d]pyrimidin-7-yl)-1-(2-(2-aminoquinolin-7-yl)propyl) bicyclo[3.1.0]hexane-2,3-diol (Compound-79a and 79b);

(1R,2R,3S,4R,5S)-1-(((2-Amino-3-bromoquinolin-7-yl)oxy)methyl)-4-(4-amino-7H-pyrrolo[2,3-d]pyrimidin-7-yl)bicyclo(3.1.0 hexane-2,3-diol (Compound-80);

(1S,2R,3S,4R,5S)-4-(4-Amino-7H-pyrrolo[2,3-d]pyrimidin-7-yl)-1-(((2-aminoquinolin-7-yl)thio)methyl) bicyclo[3.1.0]hexane-2,3-diol (Compound-81);

(1R,2R,3S,4R,5S)-1-(2-(2-Amino-3-(4-fluorophenyl)quinolin-7-yl)ethyl)-4-(4-amino-7H-pyrrolo[2,3-d]pyrimidin-7-yl)bicyclo[3.1.0]hexane-2,3-diol (Compound-82);

(1R,2R,3S,4R,5S)-1-(2-(2-Amino-3-(pyridin-3-yl)quinolin-7-yl)ethyl)-4-(4-amino-7H-pyrrolo[2,3-d]pyrimidin-7-yl)bicyclo(3.1.0 (hexane-2,3-diol (Compound-83); and (1R,2R,3S,4R,5S)-1-(2-(2-Amino-3-(3-methyl isoxazol-4-yl)quinolin-7-yl)ethyl)-4-(4-amino-7H-pyrrolo[2,3-d]pyrimidin-7-yl)bicyclo[3.1.0]hexane-2,3-diol (Compound-84), or a pharmaceutically acceptable salt, a hydrate, or a stereoisomer thereof.

In an accordance with another aspect disclosed herein, the PRMT5 inhibitor is (1 S,2R,5R)-3-(2-(2-amino-3-chloro-5-fluoroquinolin-7-yl)ethyl)-5-(4-amino-7H-pyrrolo[2,3-d]pyrimidin-7-yl)cyclopent-3-ene-1,2-diol (Compound-24) or a pharmaceutically acceptable salt thereof.

In an accordance with another aspect disclosed herein, the at least one targeted agent/cellular activity modulator is an inhibitor of EGFR or its oncogenic variants. In an accordance with a further aspect disclosed herein, the inhibitor of EGFR is Afatinib, Osimertinib, Erlotinib or Gefitinib.

In an accordance with another aspect disclosed herein, the at least one targeted agent/cellular activity modulator is an inhibitor of a SOS1 inhibitor. In an accordance with a further aspect disclosed herein, the SOS1 inhibitor is BI-3406.

In an accordance with another aspect disclosed herein, the at least one targeted agent/cellular activity modulator is an inhibitor of an ERK inhibitor. In an accordance with a further aspect disclosed herein, the ERK inhibitor is Ulixertinib, MK-8353 or ravoxertinib.

In an accordance with another aspect disclosed herein, the at least one targeted agent/cellular activity modulator is an inhibitor of PARP. In an accordance with a further aspect disclosed herein, the PARP inhibitor is Olaparib, Niraparib, Rucaparib or Talazoparib (BMN-673).

In an accordance with another aspect disclosed herein, the at least one targeted agent/cellular activity modulator is an inhibitor of CDK46. In an accordance with a further aspect disclosed herein, the CDK4/6 inhibitor is Palbociclib, Ribociclib and Abemaciclib.

In an accordance with another aspect disclosed herein, the at least one targeted agent/cellular activity modulator is an inhibitor of MALT1. In an accordance with a further aspect disclosed herein, the MALT1 inhibitor is MI-2, JNJ-67856633.

In an accordance with another aspect disclosed herein, the at least one targeted agent/cellular activity modulator is an inhibitor of BTK. In an accordance with a further aspect disclosed herein, the BTK inhibitor is ibrutinib, zanubrutinib and acalabrutinib.

In an accordance with another aspect disclosed herein, the PRMT5 Inhibitor compound is administered simultaneously, concurrently, sequentially, successively, alternately or separately with the at least one targeted agent/cellular activity modulator selected from an EGFR inhibitor, a KRAS inhibitor, a KRAS-G12C inhibitor, a Bcl-2 inhibitor, a SOS1 inhibitor, a PARP inhibitor, a RAT inhibitor, a ERK inhibitor, a CDK4/6 inhibitor, a MALT1 inhibitor, a BTK inhibitor, MAT2A inhibitor, a PI3K inhibitor, a AKT inhibitor, a BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator.

In an accordance with another aspect disclosed herein, a pharmaceutical combination for treating and/or preventing cancer in a subject, the pharmaceutical combination comprising:
    (a) compound (1S,2R,5R)-3-(2-(2-amino-3-chloro-5-fluoroquinolin-7-yl)ethyl)-5-(4-amino-7H-pyrrolo[2,3-d]pyrimidin-7-yl)cyclopent-3-ene-1,2-diol (Compound-24) or a pharmaceutically acceptable salt thereof, and
    (b) Afatinib.

In an accordance with another aspect disclosed herein, a pharmaceutical combination for treating and/or preventing cancer in a subject, the pharmaceutical combination comprising:
    (a) compound (1S,2R,5R)-3-(2-(2-amino-3-chloro-5-fluoroquinolin-7-yl)ethyl)-5-(4-amino-7H-pyrrolo[2,3-d]pyrimidin-7-yl)cyclopent-3-ene-1,2-diol (Compound-24) or a pharmaceutically acceptable salt thereof, and
    (b) BI-3406.

In an accordance with another aspect disclosed herein, a pharmaceutical combination for treating and/or preventing cancer in a subject, the pharmaceutical combination comprising:
    (a) compound (1S,2R,5R)-3-(2-(2-amino-3-chloro-5-fluoroquinolin-7-yl)ethyl)-5-(4-amino-7H-pyrrolo[2,3-d]pyrimidin-7-yl)cyclopent-3-ene-1,2-diol (Compound-24) or a pharmaceutically acceptable salt thereof, and
    (b) Ulixertinib.

In an accordance with another aspect disclosed herein, a method of treating and/or preventing cancer in a human subject in need thereof, the method comprising administering to the human subject a therapeutically effective amount of any of the pharmaceutical combinations disclosed herein.

In an accordance with another aspect disclosed herein, the cancer is glioblastoma multiforme, prostate cancer, pancreatic cancer, mantle cell lymphoma, non-Hodgkin's lymphomas and diffuse large B-cell lymphoma, acute myeloid leukemia, acute lymphoblastic leukemia, multiple myeloma, non-small cell lung cancer, small cell lung cancer, breast cancer, triple negative breast cancer, gastric cancer, colorectal cancer, ovarian cancer, bladder cancer, hepatocellular cancer, melanoma, sarcoma, oropharyngeal squamous cell carcinoma, chronic myelogenous leukemia, epidermal squamous cell carcinoma, nasopharyngeal carcinoma, neuroblastoma, endometrial carcinoma, head and neck cancer, or cervical cancer.

BRIEF DESCRIPTION OF FIGURES

The drawings form part of the present specification and are included to further demonstrate certain aspects of the embodiments described herein. These embodiments may be better understood by reference to one or more of the following drawings in combination with the detailed description.

DETAILED DESCRIPTION

Figure 1:
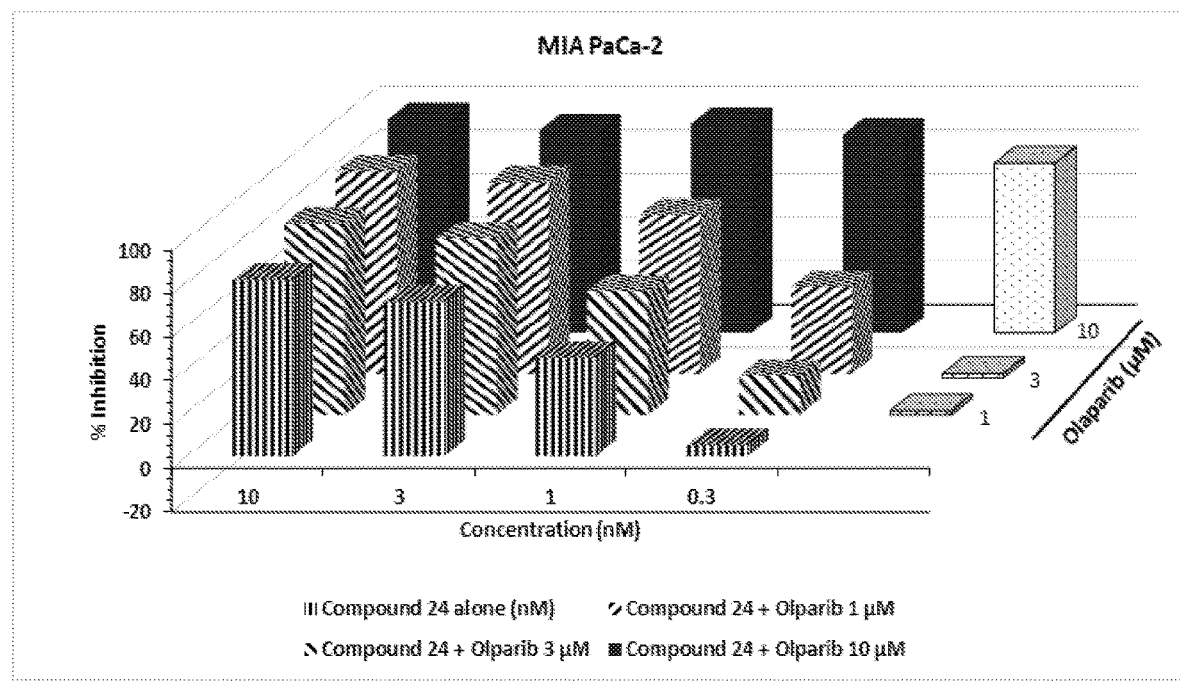
FIG. 1 shows the in vitro inhibition effect of a representative combination of the invention, Compound-24 with the PARP inhibitor-Olaparib, in MIA PaCa-2 cells.
Figure 2:
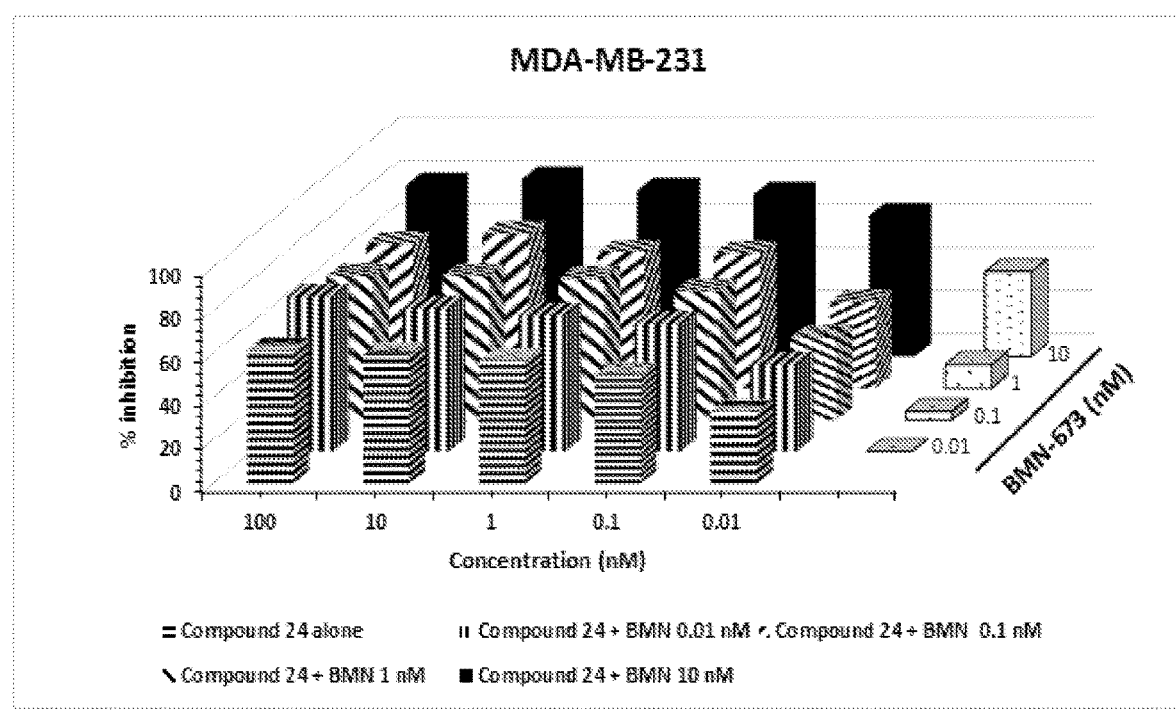
FIG. 2 shows the in vitro inhibition effect of a representative combination of the invention, Compound-24 with the PARP inhibitor BMN-673, in MDA-MB-231 cells.
Figure 3:
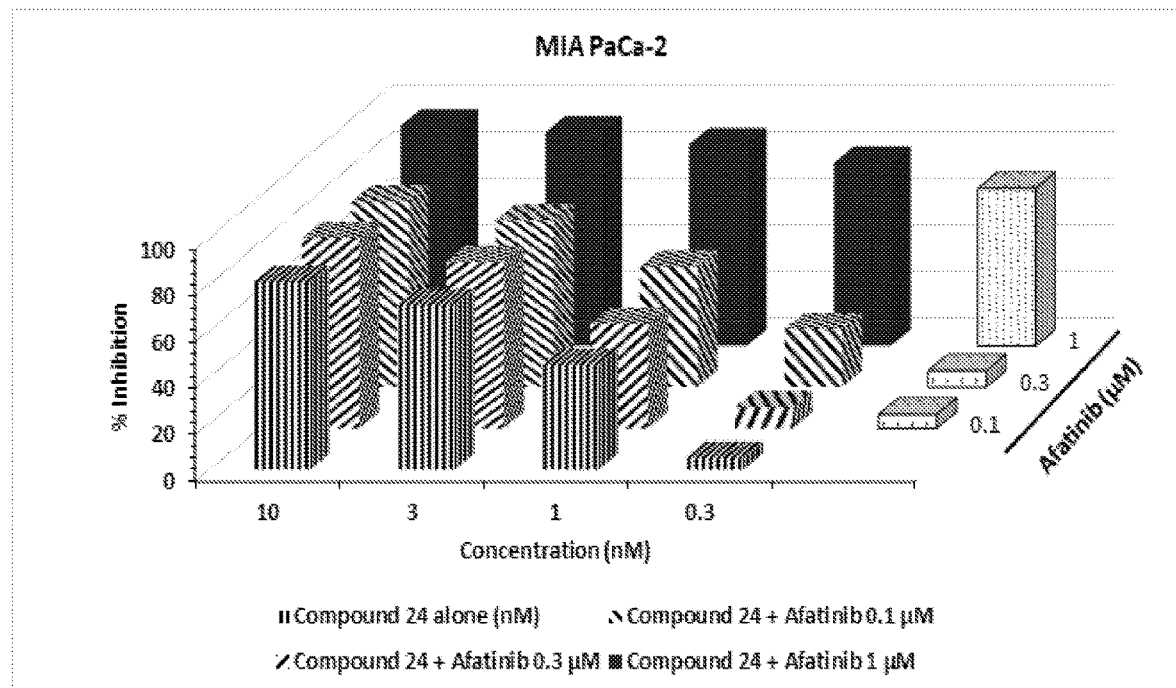
FIG. 3 shows the in vitro inhibition effect of a representative combination of the invention, Compound-24 with EGFR inhibitor Afatinib, in MIA PaCa-2 cells.
Figure 4:
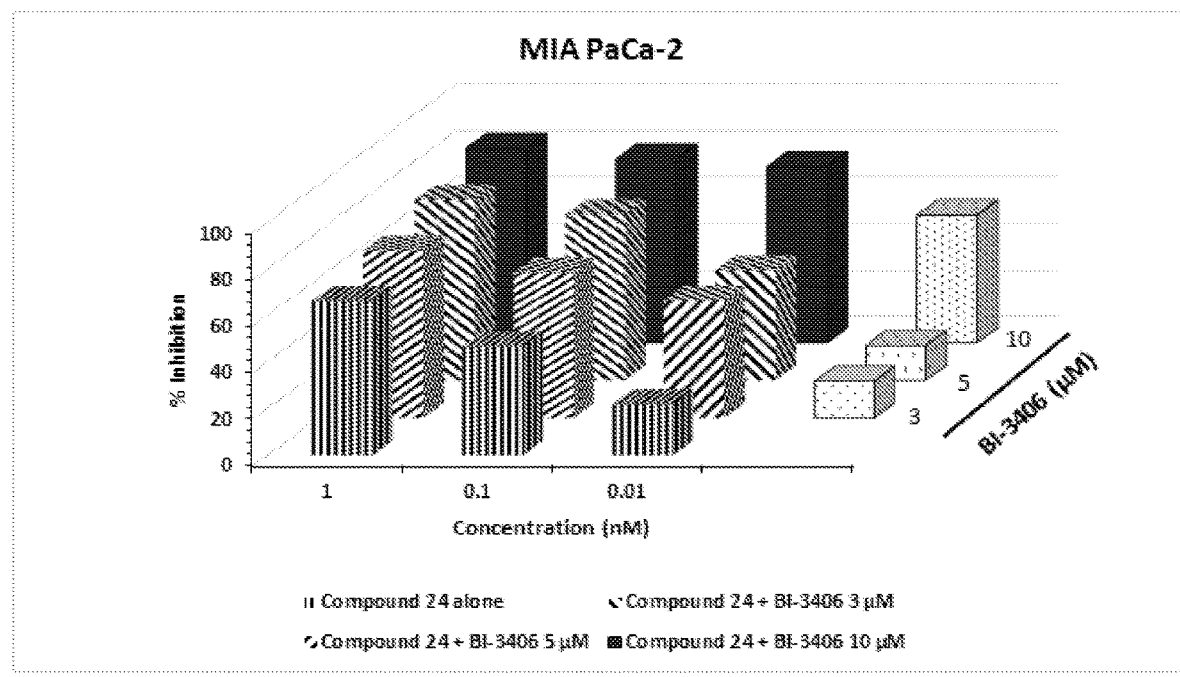
FIG. 4 shows the in vitro inhibition effect of a representative combination of the invention, Compound-24 with SOS1 inhibitor BI-3406, in MIA PaCa-2 cells.
Figure 5:
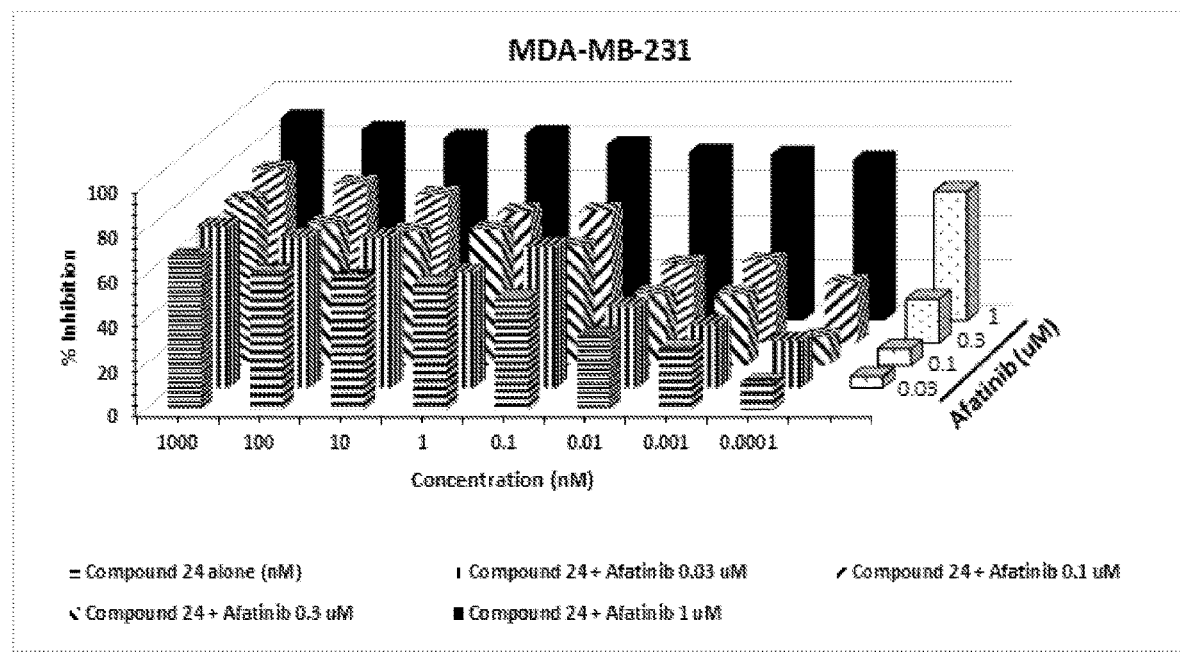
FIG. 5 shows the in vitro inhibition effect of a representative combination of the invention, Compound-24 with EGFR inhibitor Afatinib in MDA-MB-231 cells.
Figure 6:
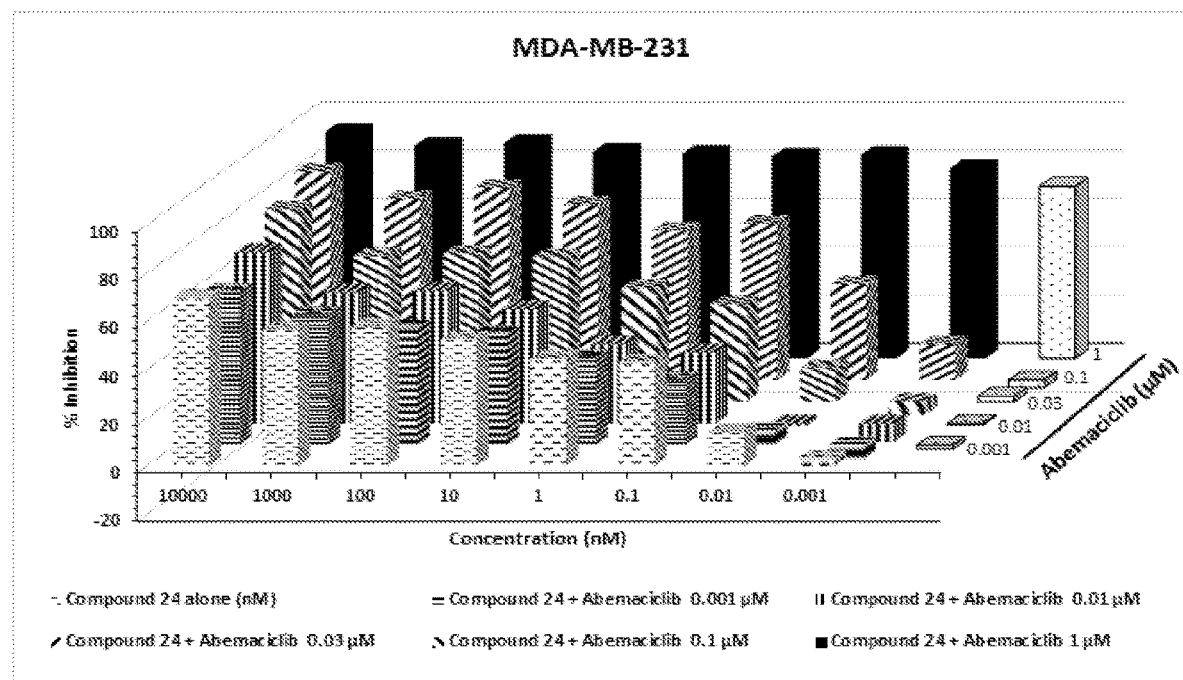
FIG. 6 shows the in vitro inhibition effect of a representative combination of the invention, Compound-24 with CDK4/6 inhibitor Abemaciclib in MDA-MB-231 cells.
Figure 7:
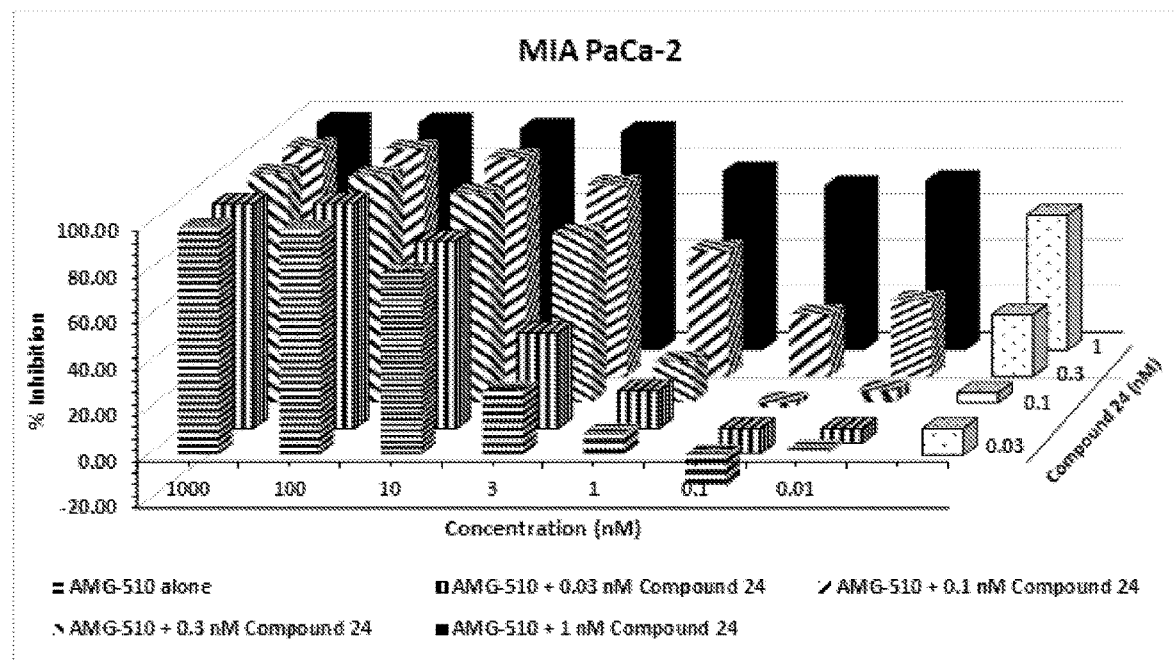
FIG. 7 presents a line graph showing the in vitro inhibition effect of a representative combination of the invention, Compound-24 with the KRAS-G12C inhibitor AMG510, in MIA PaCa-2 cells.

This description of the exemplary embodiments is intended to be read in connection with the accompanying drawings/Figures, which are to be considered part of the entire written description. The drawings/Figures are not necessarily to scale and certain features may be shown exaggerated in scale or in somewhat schematic form in the interest of clarity and conciseness.

Some species of PRMT5 Inhibitors, none of which are compounds of Formula (I), can be combined with several cellular activity modulators for treatment of cancer. The targeted therapeutic agent/cellular activity modulator for cancer treatment included: PARP inhibitors (Cell Reports 2018, 24, 2643-2657); EGFR inhibitors (Nat Cell Biol. 2011 February; 13(2): 174-181; Cancer Medicine, 2019, 8(5), 2414-2428); SOS1 inhibitors (Science, 2019,363(6433), 1280-1281); RAF inhibitors (Sci Signal, 2011; 41190): ra58); ERK inhibitors (Nat Cell Biol. 2011 February; 13(2): 174-181); CDK4/6 inhibitors (Proc Natl Acad Sci USA. 2019; 116(36):17990-1800(1); MALT1 inhibitors (AACR. Annual Meeting 2020; Apr. 27-28, 2020 and Jun. 22-24, 2020); BTK inhibitors (J Clin Oncol 2020, 38(25); 2937); PI3K inhibitors (Leukemia, 2019 May 23. doi: 10.1038/s41375-019-0489-6); AKT inhibitors (1 Cell Mol Med. 2019; 23(2):1333-1342); FGFR inhibitors (Cancer Res 2015; 21(12); 2684-94); c-Met inhibitors (Sci Signal, 2011; 4(190): ra58; Cancer Medicine 2018; 7(3):869-882).

The invention relates to a pharmaceutical combination comprising a combination of a PRMT5 Inhibitor of Formula (I), and at least one targeted agent/cellular activity modulator selected from an EGFR, inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT inhibitor, a BTK inhibitor, MAT2A inhibitor, a PI3K inhibitor, a AKT inhibitors BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator, wherein the PRMT5 Inhibitor is compound Formula (I),

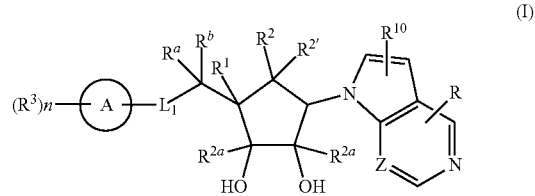

its tautomeric form, its stereoisomer, its pharmaceutically acceptable salt, their polymorph, and solvate thereof,
wherein,
$L_1$ is selected from —$CR^aR^b$—$NR^a$—, S, and O;
Z=CH or N;
$R^a$ and $R^b$ are independently selected at each occurrence from hydrogen, substituted or unsubstituted alkyl, and substituted or unsubstituted cycloalkyl;
ring A is selected from,

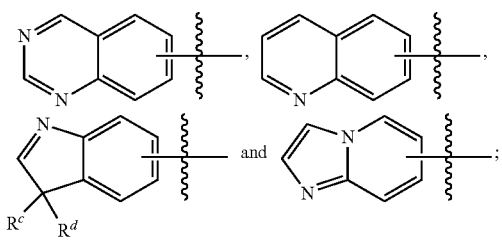

$R^c$ and $R^d$ are selected from substituted or unsubstituted alkyl or together with the carbon atoms to which they are attached form a $C_3$-$C_6$ cycloalkyl ring;
R is selected from —$NR^4R^5$, hydrogen, halogen, substituted or unsubstituted alkyl, substituted or unsubstituted alkoxy, substituted or unsubstituted heteroaryl and substituted or unsubstituted cycloalkyl;

$R^1$ and $R^2$ together with the carbon atoms to which they are attached form a bond in order to form a —C≡C—; or $R^1$ and $R^2$ together with the carbon atoms to which they are attached form a cyclopropane ring;

$R^{2'}$ and $R^{2a}$ which may be same or different and are independently selected from hydrogen and substituted or unsubstituted alkyl;

$R^3$ is independently selected at each occurrence from halogen, cyano, nitro, substituted or unsubstituted alkyl, —$OR^6$, —$NR^7R^8$, substituted or unsubstituted cycloalkyl, —C(O)OH, —C(O)O-alkyl, —C(O)$R^9$, —C(O)$NR^7R^8$, —$NR^7C(O)R^9$, substituted or unsubstituted aryl, substituted or unsubstituted heteroaryl, and substituted or unsubstituted heterocyclyl;

$R^4$ and $R^5$ are independently selected from hydrogen, substituted or unsubstituted alkyl, and substituted or unsubstituted cycloalkyl;

$R^6$ is selected from hydrogen, substituted or unsubstituted alkyl, and substituted or unsubstituted cycloalkyl;

$R^7$ and $R^8$ are independently selected from hydrogen, substituted or unsubstituted alkyl, and substituted or unsubstituted cycloalkyl;

$R^9$ is selected from substituted or unsubstituted alkyl and substituted or unsubstituted cycloalkyl;

$R^{10}$ is selected from hydrogen, halogen, and substituted or unsubstituted alkyl;

'n' is an integer ranging from 0 to 4, both inclusive:

when an alkyl or cycloalkyl group is substituted, it is substituted with 1 to 4 substituents independently selected from oxo (=O), halogen, cyano, cycloalkyl, aryl, heteroaryl, heterocyclyl, —$OR^{7a}$, —C(O)OH, —C(=O)O(alkyl), —$NR^{8a}R^{8b}$, —$NR^{8a}C(=O)R^{9a}$, and —C(O)$NR^{8a}R^{8b}$;

when the aryl or heteroaryl group is substituted, it is substituted with 1 to 4 substituents independently selected from halogen, nitro, cyano, alkyl, haloalkyl, perhaloalkyl, cycloalkyl, heterocyclyl, aryl, heteroaryl, —$OR^{7a}$, —$NR^{8a}R^{8b}$, —$NR^{7a}C(=O)R^{9a}$, —C(=O) $R^{9a}$, —C(=O))$NR^{8a}R^{8b}$, —$SO_2$-alkyl, —C(=O)OH, and —C(O)O-alkyl;

when the heterocyclyl group is substituted, it is substituted either on a ring carbon atom or on a ring hetero atom, and when it is substituted on a ring carbon atom, it is substituted with 1 to 4 substituents independently selected from oxo halogen, cyano, alkyl, cycloalkyl, perhaloalkyl, —$OR^{7a}$, —C(=O)$NR^{8a}R^{8b}$, —C(=O) OH, —C(=O)O-alkyl, —N(H)C(=O)(alkyl), —N(H) $R^{8a}$, and —N(alkyl)$_2$; and when the heterocyclyl group is substituted on a ring nitrogen, it is substituted with substituents independently selected from alkyl, cycloalkyl, aryl, heteroaryl, —$SO_2$(alkyl), —C(=O) $R^{9a}$, and —C(=O)O(alkyl); when the heterocyclyl group is substituted on a ring sulfur, it is substituted with 1 or 2 oxo (=O) group(s);

$R^{7a}$ is selected from hydrogen, alkyl, perhaloalkyl, and cycloalkyl;

$R^{8a}$ and $R^{8b}$ axe each independently selected from hydrogen, alkyl, and cycloalkyl; and $R^{9a}$ is selected from alkyl and cycloalkyl.

In some embodiments of the invention, this disclosure includes a pharmaceutical combination comprising a combination of a PRMT5 Inhibitor of Formula (I), and at least one targeted agent/cellular activity modulator selected from an EGER inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT inhibitor, a BTK inhibitor, MAT2A inhibitor, a PI3 (inhibitor, a AKT inhibitors BTK inhibitor, MAT2A inhibitor, a PI3K inhibitor, a AKT inhibitor, a FGFR inhibitor, a Type 1 PRMT inhibitor, a STING agonist, or an immune checkpoint inhibitor/modulator, wherein the PRMT5 inhibitor is:

(1S,2R,5R)-3-(2-(2-Amino-3-bromoquinolin-7-yl)ethyl)-5-(4-amino-7H pyrrolo[2,3-d]pyrimidin-7-yl)cyclopent-3-ene-1,2-diol (Compound-1);

(1S,2R,5R)-3-(2-(2-amino-3-chloroquinolin-7-yl)ethyl)-5-(4-amino-7H-pyrrolo[2,3-d]pyrimidin-7-yl)cyclopent-3-ene-1,2-diol (Compound-2);

(1S,2R,5R)-3-(2-(2-amino-3-bromoquinolin-7-yl)ethyl)-5-(4-amino-5-fluoro-7H-pyrrolo[2,3-d]pyrimidin-7-yl)cyclopent-3-ene-1,2-diol (Compound-3);

(1S,2R,5R)-5-(4-amino-7H-pyrrolo[2,3-d]pyrimidin-7-yl)-3-(((2-aminoquinolin-7-yl)thio)methyl)cyclopent-3-ene-1,2-diol (Compound-4);

(1S,2R,5R)-3-(((2-amino-3-chloroquinolin-7-yl)thio) methyl)-5-(4-amino-7H-pyrrolo[2,3-d]pyrimidin-7-yl) cyclopent-3-ene-1,2-diol (Compound-5);

(1S,2R,5R)-5-(4-amino-7H-pyrrolo[2,3-d]pyrimidin-7-yl)-3-(((2-aminoquinolin-7-yl)(methyl)amino)methyl)cyclopent-3-ene-1,2-diol (Compound-6);

(1S,2R,5R)-3-(1-(2 Amino-3-bromoquinolin-7 yl)propan-2-yl)-5-(4-amino-7H-pyrrolo[2,3-d]pyrimidin-7-yl)cyclopent-3-ene-1,2-diol (Compound-7a and 7b);

(1S,2R,5R)-5-(4-Amino-7H-pyrrolo[2,3-d]pyrimidin-7-yl)-3-(1-((2-(methylamino) quinolin-7-yl)oxy)ethyl)cyclopent-3-ene-1,2-diol (Compound-80 and Sb);

(1S,2R,5R)-3-(((2-amino-3-chloro-5-fluoroquinolin-7-yl) oxy)methyl)-5-(4-amino-7H-pyrrolo[2,3-d]pyrimidin-7-yl)-2-methylcyclopent-3-ene-1,2-diol (Compound-9);

(1S,2R,5R)-5-(4-amino-7H-pyrrolo[2,3-d]pyrimidin-7-yl)-3-(2-(2-(methylamino)quinolin-7-yl)ethyl)cyclopent-3-ene-1,2-diol (Compound-10);

(1S,2R,5R)-5-(4-amino-7H-pyrrolo[2,3-d]pyrimidin-7-yl)-3-(2-(3-methylimidazo[1,2-a]pyridin-7-yl)ethyl)cyclopent-3-ene-1,2-diol (Compound-11);

(1S,2R,5R)-3-(((2-amino-3-chloro-5-fluoroquinolin-7-yl) oxy)methyl)-5-(4-amino-7H-pyrrolo[2,3-d]pyrimidin-7-yl)-4-methylcyclopent-3-env-1,2-dial (Compound-12);

(1S,2R,5R)-3-(2-(2-amino-3-chloro-5-fluoroquinolin-7-yl) ethyl)-5-(4-methyl-7H-pyrrolo[2,3-d]pyrimidin-7-yl)cyclopent-3-ene-1,2-diol (Compound-13);

(1S,2R,5R)-3-(2-(2-amino-3-chloro-5-fluoroquinolin-7-yl) ethyl)-5-(4-methyl-1H-pyrrolo[3,2-c]pyridin-1-yl)cyclopent-3-ene-1,2-diol hydrochloride (Compound-14);

(1S,2R,5R)-3-(2-(2 Amino-3-chloro-5-fluoroquinolin 7-yl) ethyl)-5-(1H-pyrrolo[3,2-c]pyridin-1-yl)cyclopent-3-ene-1,2-diol (Compound-15);

(1S,2R,5R)-3-(2-(2-amino-3-chloro-5-fluoroquinolin-7-yl) ethyl)-5-(7H-pyrrolo[2,3-d]pyrimidin-7-yl)cyclopent-3-ene-1,2-diol (Compound-16);

(1S,2R,5R)-5-(4-amino-7H-pyrrolo[2,3-d]-pyrimidin-1-yl)-3-(((2-aminoquinolin-7-yl)amino)methyl)cyclopent-3-ene-1,2-diol (Compound-17);

(1S,2R,5R)-3-(((2-amino-3-chloro-5-fluoroquinolin-7-yl) oxy)methyl)-5-(4-amino-7H-pyrrolo[2,3-d]pyrimidin-7-yl)cyclopent-3-ene-1,2-dial (Compound-18);

(1S,2R,5R)-5-(4-amino-7H-pyrrolo[2,3-d]pyrimidin-7-yl)-3-(((2-(methylamino)quinolin-7-yl)oxy)methyl)cyclopent-3-ene-1,2-diol (Compound-19);

(1S,2R,5R)-3-(1-((2-amino-3-chloro-5-fluoroquinolin-7-yl) oxy)ethyl)-5-(4-amino-7H-pyrrolo[2,3-d]pyrimidin-7-yl) cyclopent-3-ene-1,2-diol (Compound-20a and 20b);

(1S,2R,5R)-3-(2-(2-amino-3-chloroquinolin-7-yl)ethyl)-5-(4-methyl-7H-pyrrolo[2,3-d]pyrimidin 7-yl)cyclopent-3-ene-1,2-dial (Compound-21);

(1S,2R,5R)-5-(4-Amino-7H-pyrrolo[2,3-d]pyrimidin-7 yl)-3-(2-(2-(cyclobutylamino) quinolin-7-yl)ethyl)cyclopent-3-ene-1,2-diol (Compound-22);

(1S,2R,5R)-3-(2-(2-Amino-3-fluoroquinolin-7-yl)ethyl)-5-(4-amino-7H-pyrrolo[2,3-d]pyrimidin-7-yl)cyclopent-3-ene-1,2-diol (Compound-23);

(1S,2R,5R)-3-(2-(2-amino-3-chloro-5-fluoroquinolin-7-yl)ethyl)-5-(4-amino-7H-pyrrolo[2,3-d]pyrimidin-7-yl)cyclopent-3-ene-1,2-diol (Compound-24);

(1S,2R,5R)-3-(2-(2-amino-3-chloro-6-fluoroquinolin-7-yl)ethyl)-5-(4-amino-7H-pyrrolo[2,3-d]pyrimidin-7-yl)cyclopent-3-ene-1,2-dial (Compound-25);

(1S,2R,5R)-3-(2-(2-amino-3-chloro-8-fluoroquinolin-7-yl)ethyl)-5-(4-amino-7H-pyrrolo[2,3-d]pyrimidin-7-yl)cyclopent-3-ene-1,2-diol (Compound-26);

(1S,2R,5R)-3-(2-(2-amino-3,3-dimethyl-3H-indol-6-yl)ethyl)-5-(4-amino-7H-pyrrolo[2,3-d]pyrimidin-7 yl)cyclopent-3-ene-1,2-diol (Compound-27);

(1S,2R,5R)-5-(4-amino-7H-pyrrolo[2,3-d]pyrimidin-7-yl)-3-(2-(2'-aminospiro[cyclobutane-1,3'-indol]-6'-yl)ethyl)cyclopent-3-ene-1,2-diol (Compound-28);

(1S,2R,5R)-3-(2-(2-amino-3,5-dichloroquinolin-7-yl)ethyl)-5-(4-amino-7H-pyrrolo[2,3-d]pyrimidin-7-yl)cyclopent-3-ene-1,2-diol (Compound-29);

(1S,2R,5R)-3-(2-(2-amino-3-chloroquinolin-7-yl)ethyl)-5-(2-amino-7H-pyrrolo[2,3-d]pyrimidin-7 yl)cyclopent-3-ene-1,2-diol (Compound-30);

(1S,2R,5R)-3-(2-(2-amino-3-chloro-5-fluoroquinolin-7-yl)ethyl)-5-(4-isopropyl-7H-pyrrolo[2,3-d]pyrimidin-7-yl)cyclopent-3-cane-1,2-diol (Compound-31);

(1S,2R,5R)-3-(2-(2-amino-3-chloro-5-fluoroquinolin-7-yl)ethyl)-5-(4-(1-methyl-1H-pyrazol-4-yl)-7H-pyrrolo[2,3-d]pyrimidin-7-yl)cyclopent-3-ene-1,2-diol (Compound-32);

(1S,2R,5R)-3-(1-(2-amino-3-chloro-5-fluoroquinolin-7-yl)propan-2-yl)-5-(4-amino-7H-pyrrolo[2,3-d]pyrimidin-7-yl)cyclopent 3-ene-1,2-diol (Compound-33a and 33b):

(1S,2R,5R)-3-(1-(2-amino-3-chloroquinolin-7 yl)propan-2-yl)-5-(4-amino-7H-pyrrolo[2,3-d]pyrimidin-7-yl)cyclopent-3-ene-1,2-diol (Compound-34a and 34b);

(1S,2R,5R)-3-(1-(2-Amino-3-chloro-5-fluoroquinolin-7-yl)propan-2-yl)-5-(4-methyl-7H pyrrolo[2,3-d]pyrimidin-7-yl)cyclopent-3-ene-1,2-diol (Compound-35a and 35b);

(1S,2R,5R)-3-(1-(2-amino-3-chloro-5-fluoroquinolin-7-yl)propan 2-yl)-2-methyl-5-(4-methyl-7H-pyrrolo[2,3-d]pyrimidin-7-yl)cyclopent-3-ene-1,2-diol (Compound-36a and 36b);

(1S,2R,5R)-3-(2-(2-amino-3-chloro-5-fluoroquinolin-7-yl)ethyl)-5-(4-amino-7H-pyrrolo[2,3-d]pyrimidin-7-yl)-2-methylcyclopent-3-ene-1,2-diol (Compound-37);

(1S,2R,5R)-3-(1-(2-amino-3-chloro-5-fluoroquinolin-7-yl)propan-2-yl)-5-(4-amino-7H-pyrrolo[2,3-d]pyrimidin-7-yl)-2-methylcyclopent-3-ene-1,2-diol (Compound-38);

(1S,2R,5R)-3-(2-(2-amino-3-chloro-5-fluoroquinolin-7-yl)ethyl)-2-methyl-5-(4-methyl-7H-pyrrolo[2,3-d]pyrimidin-7-yl)cyclopent-3-ene-1,2-diol (Compound-39);

(1S,2R,5R)-3-(2-(2-amino-3-chloro-5-fluoroquinolin-7-yl)ethyl)-5-(4-amino-7H-pyrrolo[2,3-d]pyrimidin-7-yl)-2-ethylcyclopent-3-ene-1,2-diol (Compound-4);

(1S,2R,5R)-3-(2-(2-amino-3-chloro-5-fluoroquinolin-7-yl)ethyl)-5-(4-ethyl-7H-pyrrolo[2,3-d]pyrimidin-7-yl)cyclopent-3-ene-1,2-diol (Compound-41);

(1S,2R,5R)-3-(2-(2-amino-3-chloro-5-fluoroquinolin-7-yl)ethyl)-5-(4-cyclopropyl-7H-pyrrolo[2,3-d]pyrimidin-7-yl)cyclopent-3-ene-1,2-diol (Compound-42);

(1S,2R,5R)-3-(2-(2 Amino-3-bromo-5-fluoroquinolin-7-yl)ethyl)-5-(4-amino-7H-pyrrolo[2,3-d]pyrimidin-7-yl cyclopent-3-ene-1,2-diol (Compound-43);

(1S,2R,5R)-3-(2-(2-Amino-3-bromo-5-fluoroquinolin-7-yl)ethyl)-5-(4-methyl-7H pyrrolo[2,3-d]pyrimidin-7-yl)cyclopent-3-ene-1,2-diol (Compound-44);

(1S,2R,5R)-3-(1-(2-Amino-3-bromo-5-fluoro quinolin-7-yl)propan-2-yl)-5-(4-amino-7H-pyrrolo[2,3-d]pyrimidin-7-yl)cyclopent-3-ene-1,2-diol (Compound-45a and 45b);

(1S,2R,5R)-3-(2-(2-Amino-6-fluoroquinolin-7 yl)ethyl)-5-(4-amino-7H-pyrrolo[2,3-d]pyrimidin-7 yl)cyclopent-3-ene-1,2-dial (Compound-46);

(1 S, 2R,5R)-3-(2-(2-amino-5-fluoroquinolin-7-yl)ethyl)-5-(4-amino-7H-pyrrolo[2,3-d]pyrimidin-7 yl)cyclopent-3-ene-1,2-dial (Compound-47);

(1R,2R,3S,4R,5S)-1-(2-(2-Amino-3-chloro-5-fluoroquinolin-7-yl)ethyl)-4-(4-amino-7H-pyrrolo[2,3-d]pyrimidin-7-yl)bicyclo[3.1.0]hexane-2,3-diol (Compound-48);

(1R,2R,3S,4R,5S)-4-(4-Amino-7H-pyrrolo[2,3-d]pyrimidin-7-yl)-1-(2-(2-(methylamino)quinolin-7-yl)ethyl)bicyclo[3.1.0]hexane-2,3-diol (Compound-49);

(1R,2R,3S,4R,5S)-4-(4-Amino-7H-pyrrolo[2,3-d]pyrimidin-7-yl)-1-(2-(2-(isopropylamino)quinolin-7-yl)ethyl)bicyclo[3.1.0]hexane-2,3-diol (Compound-50);

(1R,2R,3S,4R,5S)-4-(4-Amino-7H-pyrrolo[2,3-d]pyrimidin-7-yl)-1-(2-(2-(cyclobutylamino)quinolin-7-yl)ethyl)bicyclo[3.1.0]hexane-2,3-diol (Compound-51);

(1R,2R,3S,4R,5S)-4-(4-Amino-7H-pyrrolo[2,3-d]pyrimidin-7-yl)-1-(2-(2-((cyclopropylmethyl)amino) quinolin-7-yl)ethyl)bicyclo[3.1.0]hexane-2,3-diol (Compound-S2);

(1R,2R,3S,4R,5S)-4-(4-Amino-7H-pyrrolo[2,3-d]pyrimidin-7-yl)-1-(2-(2-amino-5-fluoroquinolin-7-yl)ethyl)bicyclo[3.1.0]hexane-2,3-diol (Compound-53);

(1R,2R,3S,4R,5S)-1-(2-(2-Amino-3-methylquinolin-7-yl)ethyl)-4-(4-amino-7H-pyrrolo[2,3-d]pyrimidin-7-yl)bicyclo[3.1.0]hexane-2,3-diol (Compound-54);

(1R,2R,3S,4R,5S)-1-(2-(2-Amino-3-isopropyl quinolin-7-yl)ethyl)-4-(4-amino-7H-pyrrolo[2,3-d]pyrimidin-7-yl)bicyclo[3.1.0]hexane-2,3-dial (Compound-55);

(1R,2R,3S,4R,5S)-1-(2-(2-Amino-3-(1,1-di fluoroethyl) quinolin-7-yl)ethyl)-4-(4-amino-7H-pyrrolo[2,3-d]pyrimidin-7-yl)bicyclo[3.1.0]hexane-2,3-diol (Compound-56);

(1R,2R,3S,4R,5S)-1-(2-(2-Amino-3-cyclopropylquinolin-7-yl)ethyl)-4-(4-amino-7H-pyrrolo[2,3-d]pyrimidin-7-yl)bicyclo[3.1.0]hexane-2,3-diol (Compound-57);

(1R,2R,3S,4R,5S)-1-(2-(2-Amino-3-methoxyquinolin-7-yl)ethyl)-4-(4-amino-7H-pyrrolo[2,3-d]pyrimidin-7-yl)bicyclo[3.1.0]hexane-2,3-diol (Compound-58);

2-amino-7-(2-((1R,2R,3S,4R,5S)-4-(4-Amino-7H-pyrrolo[2,3-d]pyrimidin-7-yl)-2,3-dihydroxybicyclo[3.1.0]hexan-1-yl)ethyl)quinoline-3-carbonitrile (Compound-59);

(1R,2R,3S,4R,5S)-1-(2-(2-Amino-3-(fluoroquinolin-7 yl)ethyl)-4-(4-amino-7H-pyrrolo[2,3-d]pyrimidin-7-yl)bicyclo[3.1.0]hexane-2,3-diol (Compound-60);

(1R,2R,3S,4R,5S)-1-(2-(2-Amino-3-chloroquinolin-7-yl)ethyl)-4-(4-amino-7H-pyrrolo[2,3-d]pyrimidin-7-yl)bicyclo[3.1.0]hexane-2,3-diol (Compound-61);

(1R,2R,3S,4R,5S)-1-(2-(2-Amino-3-chloro-6-fluoroquinolin-7-yl)ethyl)-4-(4-amino-7H-pyrrolo[2,3-d]pyrimidin-7-yl) bicyclo[3.1.0]hexane-2,3-diol (Compound-62);

(1R,2R,3S,4R,5S)-1-(2-(2-Amino-3-chloro-8-fluoroquino-lin-7-yl)ethyl)-4-(4-amino-7H-pyrrolo[2,3-d]pyrimidin-7-yl)bicyclo[3.1.0]hexane-2,3-diol (Compound-63);

(1R,2R,3S,4R,5S)-1-(2-(2-amino-3-bromo-6-fluoroquino-lin-7-yl)ethyl)-4-(4-amino-7H-pyrrolo[2,3-d]pyrimidin-7-yl)bicyclo[3.1.0]hexane-2,3-diol (Compound-64);

(1R,2R,3S,4R,5S)-4-(4-Amino-7H-pyrrolo[2,3-d]pyrimi-din-7-yl)-1-(2-(3-methylimidazol[1,2-a]pyridin-7-yl)ethyl)bicyclo[3.1.0]hexane-2,3-diol (Compound-65);

(1R,2R,3S,4R,5S)-1-(2-(2-Amino-3,3-dimethyl-3H-indol-6-yl)ethyl)-4-(4-amino-7H-pyrrolo[2,3-d]pyrimidin-7-yl)bicyclo[3.1.0]hexane-2,3-diol (Compound-66);

(1R,2R,3S,4R,5S)-1-(2-(2-Amino-3-chloro-5-fluoroquino-lin-7-yl)ethyl)-4-(4-amino-6-methyl-7H-pyrrolo[2,3-d]pyrimidin-7-yl)bicyclo[3.1.0]hexane-2,3-diol (Compound-67);

(1R,2R,3S,4R,5S)-1-(2-(2-Amino-3-chloro-6-fluoroquino-lin-7-yl)ethyl-4-(4-amino-6-methyl-7H-pyrrolo[2,3-d]pyrimidin-7-yl)bicyclo[3.1.0]hexane-2,3-diol (Compound-68);

(1R,2R,3S,4R,5S)-1-(2-(2-amino-3-chloro-5-fluoroquino-lin-7-yl)ethyl)-4-(4-methyl-7H-pyrrolo[2,3-d]pyrimidin-7-yl) bicyclo[3.1.0]hexane-2,3-diol (Compound-69);

(1R,2R,3S,4R,5S)-1-(2-(2-Amino-3-chloro-5-fluoroquino-lin-7-yl)ethyl)-4-(7H-pyrrolo[2,3-d]pyrimidin-7-yl)bicy-clo[3.1.0]hexane-2,3-diol (Compound-70);

(1R,2R,3S,4R,5S)-4-(4-Amino-7H-pyrrolo[2,3-d]pyrimi-din-7-yl)-1-(2-(2'-aminospiro[cyclobutane-1,3'-indol]-6'-yl)ethyl)bicyclo[3.1.0]hexane-2,3-diol (Compound-71);

(1R,2R,3S,4R,5S)-1-(2-(2-Amino-3-bromo-5-fluoroquino-lin-7-yl)ethyl)-4-(4-amino-7H-pyrrolo[2,3-d]pyrimidin-7-yl)bicyclo[3.1.0]hexane-2,3-diol (Compound-72);

(1R,2R,3S,4R,5S)-1-(2-(2-Amino-3-bromoquinolin-7-yl) ethyl)-4-(4-amino-7H-pyrrolo[2,3-d]pyrimidin-7-yl)bi-cyclo[3.1.0]hexane-2,3-diol (Compound-73);

(1R,2R,3S,4R,5S)-4-(4-Amino-7H-pyrrolo[2,3-d]pyrimi-din-7-yl)-1-(2-(2-aminoquinolin-7-yl)ethyl)bicyclo[3.1.0]hexane-2,3-diol (Compound-74);

(1R,2R,3S,4R,5S)-4-(4-amino-7H-pyrrolo[2,3-d]pyrimidin-7-yl)-1-(2-(2-aminoquinazolin-7-yl)ethyl)bicyclo(3.1.01 hexane-2,3-diol (Compound-75);

(1S,2R,3S,4R,5S)-1-((S)-1-(2-Amino-3-bromoquinolin-7-yl)propan-2-yl)-4-(4-amino-7H-pyrrolo[2,3-d]pyrimidin-7-yl)bicyclo[3.1.0]hexane-2,3-diol (Compound-76a and 76b);

(1S,2R,3S,4R,5S-1-((S1)-2-(2-Amino-3-chloro-5-fluoro-quinoliin-7-yl)-1-cyclopropylethyl)-4-(4-amino-7H-pyr-rolo[2,3-d]pyrimidin-7-yl)bicyclo[3.1.0]hexane-2,3-diol (Compound-77a and 77b);

(1S,2R,3S,4R,5S)-1-(1-(2-Amino-3-chloro-5-fluoroquino-lin-7-yl)propan-2-yl)-4-(4-amino-7H-pyrrolo[2,3-d]py-rimidin-7-yl)bicyclo[3.1.0]hexane-2,3-diol (Compound-78a and 78b);

(1R,2R,3S,4R,5S)-4-(4-Amino-7H-pyrrolo[2,3-d]pyrimi-din-7-yl)-1-(2-(2-aminoquinolin-7-yl)propyl) bicyclo[3.1.0]hexane-2,3-diol (Compound-79a and 79b);

(1R,2R,3S,4R,5S)-1-(((2-Amino-3-bromoquinolin-7 yl)oxy)methyl)-4-(4-amino-7H-pyrrolo[2,3-d]pyrimidin-7-yl)bicyclo(3.1.0)hexane-2,3-diol (Compound-80);

(1S,2R,3S,4R,5S)-4-(4-Amino-7H-pyrrolo[2,3-d]pyrimi-din-7-yl)-1-(((2-aminoquinolin-7-yl)thio)methyl)bicyclo[3.1.0]hexane-2,3-diol (Compound-81);

(1R,2R,3S,4R,5S)-1-(2-(2-Amino-3-(4-fluorophenyl)quino-lin-7-yl)ethyl)-4-(4-amino-7H-pyrrolo(2,3-d)pyrimidin-7-yl)bicyclo[3.1.0]hexane-2,3-diol (Compound-82);

(1R,2R,3S,4R,5S)-1-(2-(2-Amino-3-(pyridin-3 yl)quinolin-7-yl)ethyl)-4-(4-amino-7H-pyrrolo[2,3-d]pyrimidin-7-yl) bicyclo[3.1.0]hexane-2,3-diol (Compound-83); or (1R,2R,3S,4R,5S)-1-(2-(2-Amino-3-(3-methyl isoxazol-4-yl)quinolin-7-yl)ethyl)-4-(4-amino-7H-pyrrolo[2,3-d]py-rimidin-7-yl)bicyclo[3.1.0]hexane-2,3-diol (Compound-84); and their pharmaceutically acceptable salts.

In some embodiments, the pharmaceutical combination comprises compound (1S,2R,5R)-3-(2-(2-amino-3-chloro-5-fluoroquinolin-7-yl)ethyl)-5-(4-amino-7H-pyrrolo[2,3-d]pyrimidin-7-yl)cyclopent-3-ene-1,2-diol (Compound-24) and at least one targeted agent/cellular activity modulator is an EGFR inhibitor, a KRAS inhibitor, a KRAS-G12C inhibitor, a MEK inhibitor, a Bcl-2 inhibitor, a SOS1 inhibi-tor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitora BTK inhibitor, MAT2A inhibitor, a PI3K inhibitor, a AKT inhibi-tor, a FGFR inhibitor, a Type I PRMT inhibitor, a STING agonist, or an immune checkpoint inhibitor, modulator, for use in the treatment and/or prevention of cancer.

In some embodiments, the pharmaceutical combination comprises at least one PRMT5 Inhibitor of formula I, and an EGFR inhibitor or its oncogenic variants. In some embodi-ments, the EGFR inhibitor is Afatinib ((E)-N-(4-(3-chloro-4-fluoroanilino)-7-[(3S)-oxolan-3-yl]oxoquinazolin-6-yl)-4-(dimethylamino)but-2-enamide), Osimeninib (N-(2-(2-(dimethylamino)ethyl-methylamino]-4-methoxy-5-[[4-(1-methylindol-3 yl)pyrimidin-2-yl]amino]phenyl]prop-2-enamide), Erlotinib (N-(3-ethynylphenyl)-6,7-bis(2-methoxyethoxy)quinazolin-4-amine), and Gefitinib (N-(3-chloro-4-fluorophenyl)-7-methoxy-6-(3-morpholin-4-ylpropoxy)quinazolin-4-amine):

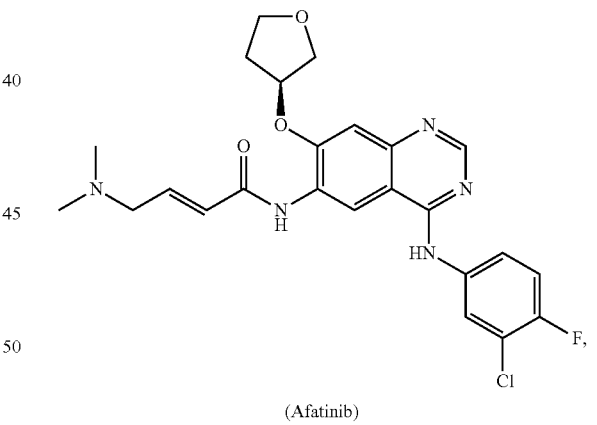

(Afatinib)

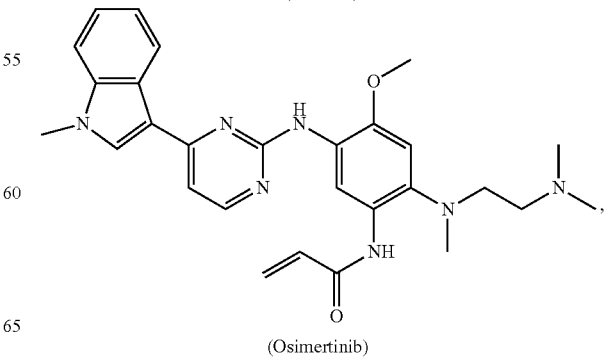

(Osimertinib)

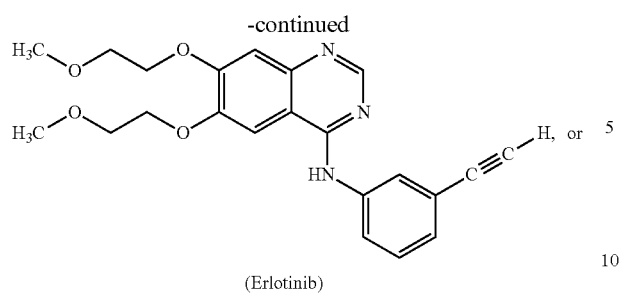

(Erlotinib)

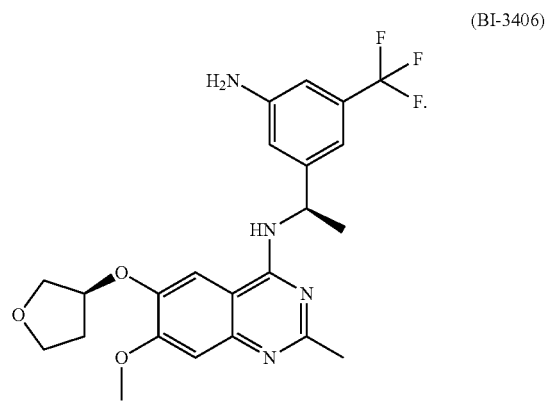 [SMILES: COc1cc2nc(C)nc(N[C@H](C)c3cc(N)cc(C(F)(F)F)c3)c2cc1O[C@H]1CCOC1]

(BI-3406)

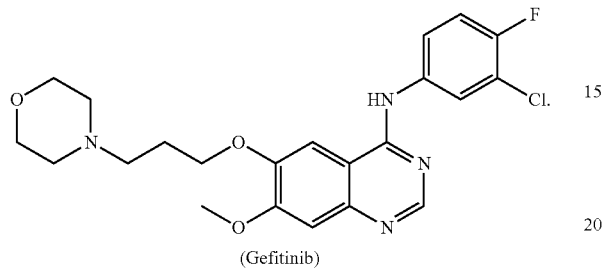

(Gefitinib)

In some embodiments, the pharmaceutical combination comprises at least one PRMT5 Inhibitor of formula I, and an SOS1 inhibitor. In some embodiments, the SOS1 inhibitor is BI-3406 (N—((R)-1-(3-amino-5-(trifluoromethyl)phenyl)ethyl)-7-methoxy-2-methyl-6-(((S)-tetrahydrofuran-3-yl)oxy)quinazolin-4-amine):

In some embodiments, the pharmaceutical combination comprises at least one PRMT5 Inhibitor of formula I, and an ERK inhibitor. In some embodiments, the ERK inhibitor is Ulixeninib (N-[(1S)-1-(3-chlorophenyl)-2-hydroxyethyl]-4-[5-chloro-2-(propan-2-ylamino)pyridin-4-yl]-1H-pyrrole-2-carboxamide), MK-8353 ((S)—N-(3-(6-isopropoxypyridin-3-yl)-1H-indazol-5-yl)-1-(2-(4-(4-(1-methyl-1H-1,2,4-triazol-3-yl)phenyl)-3,6-dihydropyridin-1(2H)-yl)-2-oxoethyl)-3-(methylthio)pyrrolidine-3-carboxamide) and ravoxertinib (1-[(1S)-1-(4-chloro-3-fluorophenyl)-2-hydroxyethyl]-4-(2-[(2-methylpyrazol-3-yl)amino]pyrimidin-4-yl]pyridin-2-one):

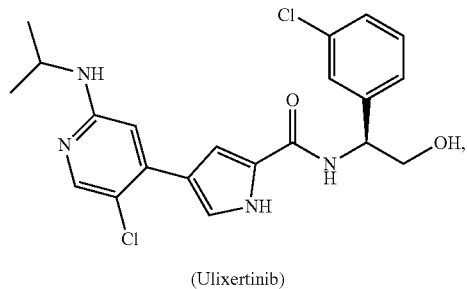

(Ulixertinib)

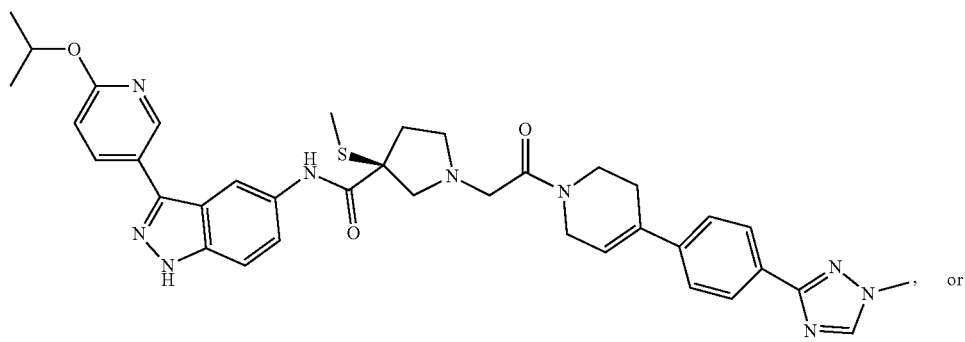

(MK-8353)

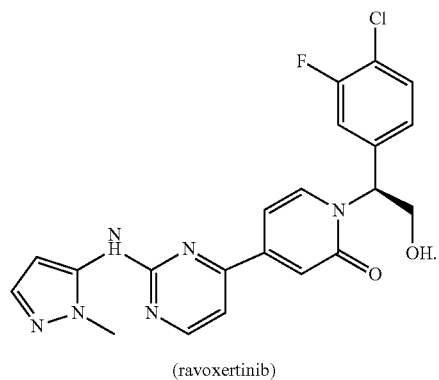

(ravoxertinib)

In some embodiments, the pharmaceutical combination comprises at least one PRMT5 Inhibitor of formula I, and a PARP inhibitor. In some embodiments, the PARP inhibitor is Olaparib (4-[[3-[4-(cyclopropanecarbonyl)piperazine-1-carbonyl]-4-fluorophenyl]methyl]-2H-phthalazin-1-one), Niraparib ((S)-2-(4-(piperidin-3-yl)phenyl)-2H-indazole-7-carboxamide), Rucaparib (6-fluoro-2-[4-(methylaminomethyl)phenyl]-3,10-diazatricyclo[6.4.1.04,13]trideca-1,4,6,8(13)-tetraen-9-one) and Talazoparib (BMN-673) ((11S,12R)-7-fluoro-11-(4 fluorophenyl)-12-(2-methyl-1,2,4-triaxal-3-yl)-2,3,10-triazatricyclo[7.3.1.05,13]trideca-1,5(13),6,8-tetraen-4-one):

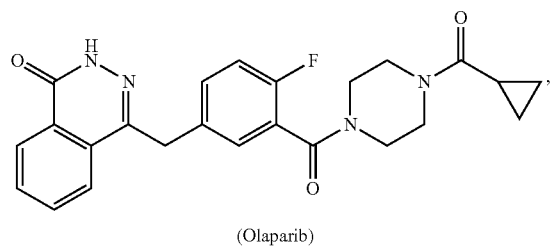

(Olaparib)

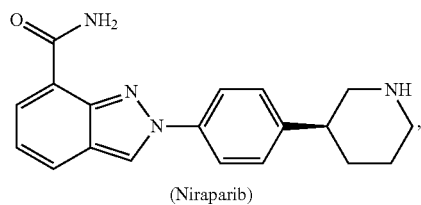

(Niraparib)

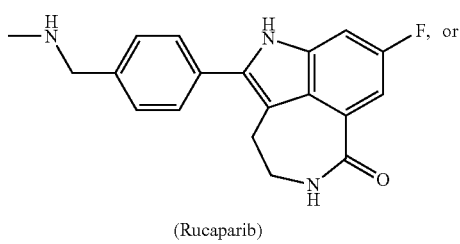

(Rucaparib)

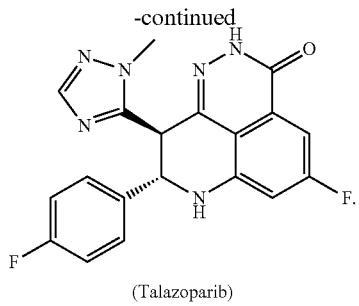

(Talazoparib)

In some embodiments, the pharmaceutical combination comprises at least one PRMT3 Inhibitor of formula I, and a CDK4/6 inhibitor. In some embodiments, the CDK4/6 inhibitor is Palbociclib (6-acetyl-8-cyclopentyl-5-methyl-2-[(5-piperazin-1-ylpyridin-2-yl)amino]pyrido[2,3-d]pyrimidin-7-one), Ribociclib (7-cyclopentyl-N,N-dimethyl-2-[(5-piperazin-1-ylpyridin-2-yl)amino]pyrrolo[2,3-d]pyrimidine-6-carboxamide) and Abemaciclib (N-[5-[(4-ethylpiperazin-1-yl)methyl]pyridin-2-yl]-5-fluoro-4-(7-fluoro-2-methyl-3-propan-2-ylbenzimidazol-5-yl)pyrimidin-2-amine):

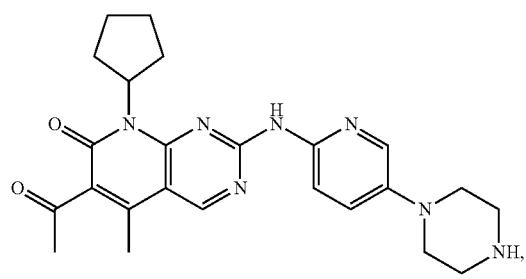

(Palbociclib)

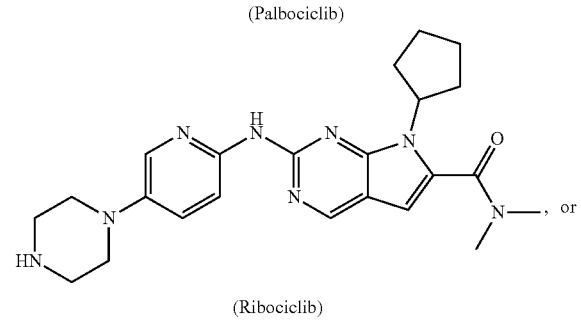

(Ribociclib)

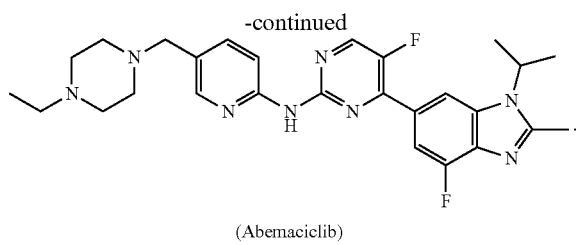

(Abemaciclib)

In some embodiments, the pharmaceutical combination comprises at least one PRMT5 inhibitor of formula I, and a BTK inhibitor. In some embodiments, the BTK inhibitor is ibrutinib (1-[(3R)-3-[4-amino-3-(4-phenoxyphenyl)pyrazolo[3,4-d]pyrimidin-1-yl]piperidin-1-yl]prop-2-en-1-one), zanubrutinib (7S)-2-(4-phenoxyphenyl)-7-(1-prop-2-enoylpiperidin-4-yl)-4,5,6,7-tetrahydropyrazalo[1,5-a]pyrimidine-3-carboxamide) or acalabrutinib (4-[8-amino-3-[(2S)-1-but-2-ynoylpyrrolidin-2-yl]imidazo[1,5-a]pyrazin-1-yl]-N-pyridin-2-ylbenzamide):

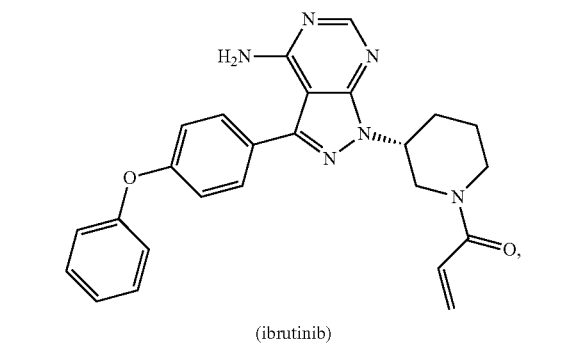

(ibrutinib)

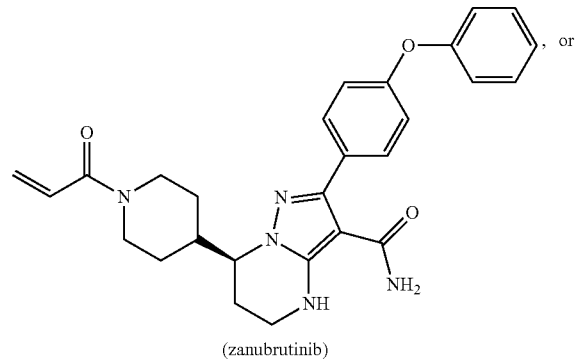

(zanubrutinib)

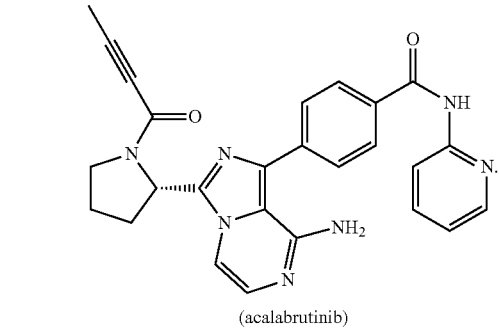

(acalabrutinib)

In some embodiments, this disclosure includes a pharmaceutical combination comprises (a) compound (1S,2R,5R)-3-(2-(2-amino-3-chloro-5-fluoroquinolin-7-yl)ethyl)-5-(4-amino-7H-pyrrolo[2,3-d]pyrimidin-7-yl)cyclopent-3-ene-1, 2-diol or a pharmaceutically acceptable salt thereof and (b) Afatinib, for use in the treatment and/or prevention of cancer in a subject in need thereof.

In some embodiments, this disclosure includes a pharmaceutical combination comprising (a) compound (1S,2R,5R)-3-(2-(2-amino-3-chloro-5-fluoroquinolin-7-yl)ethyl)-5-(4-amino-7H-pyrrolo[2,3-d]pyrimidin-7-yl)cyclopent-3-ene-1, 2-diol or a pharmaceutically acceptable salt thereof and (b) BI-3406, for use in the treatment and/or prevention of cancer in a subject in need thereof.

In some embodiments, this disclosure includes a pharmaceutical combination comprising (a) compound (1S,2R,5R)-3-(2-(2-amino-3-chloro-5-fluoroquinolin-7-yl)ethyl)-5-(4-amino-7H-pyrrolo[2,3-d]pyrimidin-7-yl)cyclopent-3-ene-1, 2-diol or a pharmaceutically acceptable salt thereof and (b) Ulixertinib, for use in the treatment and/or prevention of cancer in a subject in need thereof.

In some embodiments, this disclosure includes a pharmaceutical combination comprising a PRMT5 Inhibitor of Formula (I) with an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT inhibitor, a BTK inhibitor, MAT2A inhibitor, a PI3K inhibitor, a AKT inhibitors BTK inhibitor, MAT2A inhibitor, a PI3K inhibitor, a AKT inhibitor, a FGFR inhibitor, a Type 1 PRMT inhibitor, a STING agonist, or an immune checkpoint inhibitor/modulator. The PRMT5 Inhibitor of Formula (I) can be administered simultaneously, concurrently, sequentially, successively, alternately or separately with the at least one targeted agent/cellular activity modulator (e.g., the administration of a PRMT5 Inhibitor of Formula (I) and the at least one targeted agent/cellular activity modulator can be done in any order).

In some embodiments, this disclosure includes a method of treating and/or preventing cancer in a human subject in need thereof, the method comprising administering to the human subject a therapeutically effective amount of a pharmaceutical combination comprising PRMT5 Inhibitor of Formula (I) and at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitora BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator as defined herein, thereby treating and/or preventing the cancer in the human subject.

In some embodiments, this disclosure includes a method of treating and/or preventing a human subject having cancer, the method comprising administering to the human subject a therapeutically effective amount of a pharmaceutical combination comprising a PRMT5 Inhibitor of Formula (I) and at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitora BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator as defined herein, together with at least one of: a pharmaceutically acceptable carrier and a pharmaceutically acceptable diluent, thereby treating and/or preventing the cancer in the human subject.

In some embodiments, this disclosure includes a pharmaceutical combination comprising a PRMT5 Inhibitor of Formula (I) and at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitora BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator, as defined herein, for use in therapy and/or prevention of cancer in a subject in need thereof.

In some embodiments, this disclosure includes a pharmaceutical combination comprising a PRMT5 Inhibitor of Formula (I) and at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitora BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator, as defined herein, for use in the treatment of cancer in a subject in need thereof.

In some embodiments, this disclosure includes a pharmaceutical combination comprising a PRMT5 Inhibitor of Formula (I) and at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK416 inhibitor, a MALT inhibitor, a BTK inhibitor, MAT2A inhibitor, a PI3K inhibitor, a AKT inhibitora BTK inhibitor, MAT2A inhibitor, a PI3K inhibitor, a AKT inhibitor, a FGFR inhibitor, a Type I PRMT inhibitor, a STING agonist, or an immune checkpoint inhibitor, modulator, as defined herein, for use in reducing tumor growth rate, reducing the size of a tumor, or reducing one or more symptoms associated with having a tumor in a subject in need thereof.

In some embodiments, this disclosure includes a pharmaceutical combination comprising a PRMT5 Inhibitor of Formula (I) and at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitora BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator that can be used to treat and/or prevent various cancers which can include or exclude: glioblastoma multiforme, prostate cancer, pancreatic cancer, mantle cell lymphoma, non-Hodgkin's lymphomas and diffuse large A-cell lymphoma, acute myeloid leukemia, acute lymphoblastic leukemia, multiple myeloma, non-small cell lung cancer, small cell lung cancer, breast cancer, triple negative breast cancer, gastric cancer, colorectal cancer, ovarian cancer, bladder cancer, hepatocellular cancer, melanoma, sarcoma, oropharyngeal squamous cell carcinoma, chronic myelogenous leukemia, epidermal squamous cell carcinoma, nasopharyngeal carcinoma, neuroblastoma, endometrial carcinoma, head and neck cancer and cervical cancer.

Definitions

General terms used in formula can be defined as follows; however, the meaning stated should not be interpreted as limiting the scope of the term per se.

As used herein, the recitation of a numerical range for a variable is intended to convey that the invention may be practiced with the variable equal to any of the values within that range. Thus, for a variable that is inherently discrete, the variable can be equal to any integer value of the numerical range, including the end-points of the range. Similarly, for a variable, which is inherently continuous, the variable can be equal to any real value of the numerical range, including the end-points of the range. As an example, a variable which is described as having values between 0 and 2, can be 0, 1 or 2 for variables which are inherently discrete, and can be 0.0, 0.1, 0.01, 0.001, or any other real value, for variables which are inherently continuous.

As used herein, the term "about" is intended to qualify the numerical values which it modifies, denoting such a value as variable within a margin of error. When no particular margin of error, such as a standard deviation to a mean value, is recited, the term "about" means plus or minus 10% of the numerical value of the number with which it is being used. Therefore, e.g., about 50% means in the range of 45%-55%.

As used herein, the terms "halogen" or "halo" means fluorine, chlorine, bromine, or iodine.

As used herein, the term "alkyl" refers to an alkane derived hydrocarbon radical that includes solely carbon and hydrogen atoms in the backbone, contains no unsaturation, has from one to six carbon atoms, and is attached to the remainder of the molecule by a single bond, for example $(C_1-C_6)$alkyl or $(C_1-C_4)$alkyl, representative groups include e.g., methyl, ethyl, n-propyl, 1-methylethyl (isopropyl), n-butyl, n-pentyl and the like. Unless set forth or recited to the contrary, all alkyl groups described or claimed herein may be straight chain or branched.

As used herein, the term "alkenyl" refers to a hydrocarbon radical containing from 2 to 10 carbon atoms and including at least one carbon-carbon double bond. Non-limiting Examples of alkenyl groups include, for example $(C_2-C_6)$ alkenyl, $(C_2-C_4)$alkenyl, ethenyl, 1-propenyl, 2-propenyl (ally), iso-propenyl, 2-methyl-1-propenyl, 1-butenyl, 2-butenyl and the like. Unless set forth or recited to the contrary, all alkenyl groups described or claimed herein may be straight chain or branched.

As used herein, the term "alkynyl" refers to a hydrocarbon radical containing 2 to 10 carbon atoms and including at least one carbon-carbon triple bond. Non-limiting Examples of alkynyl groups include, for example $(C_2-C_6)$alkynyl, $(C_2-C_4)$alkynyl, ethynyl, propynyl, butynyl and the like. Unless set forth or recited to the contrary, all alkynyl groups described or claimed herein may be straight chain or brunched.

As used herein, the term "haloalkyl" refers to an alkyl group as defined above that is substituted by one or more halogen atoms as defined above. For example $(C_1-C_6)$ haloalkyl or $(C_1-C_4)$haloalkyl. Suitably, the haloalkyl may be monohaloalkyl, dihaloalkyl or polyhaloalkyl including perhaloalkyl. A monohaloalkyl can have one iodine, bromine, chlorine or fluorine atom. Dihaloalkyl and polyhaloalkyl groups can be substituted with two or more of the same halogen atoms or a combination of different halogen atoms. Suitably, a polyhaloalkyl is substituted with up to 12 halogen atoms. Non-limiting Examples of a haloalkyl include fluoromethyl, difluoromethyl, trifluoromethyl, chloromethyl, dichloromethyl, trichloromethyl, pentafluoroethyl, heptafluoropropyl, difluorochloromethyl, dichlorofluoromethyl, difluoroethyl, difluoropropyl, dichloroethyl, dichloropropyl and the like. A perhaloalkyl refers to an alkyl having all hydrogen atoms replaced with halogen atoms. Unless set forth or recited to the contrary, all haloalkyl groups described or claimed herein may be straight chain or branched.

As used herein, the term "alkoxy" denotes an alkyl group attached via an oxygen linkage to the rest of the molecule. Representative examples of such groups are —OCH$_3$ and —OC$_2$H$_5$. Unless set forth or recited to the contrary, all alkoxy groups described or claimed herein may be straight chain or branched.

As used herein, the term "alkoxyalkyl" refers to an alkoxy group as defined above directly bonded to an alkyl group as defined above, e.g., —CH$_2$—O—CH$_3$, —CH$_2$—O—CH$_2$CH$_3$, —CH$_2$CH$_2$—O—CH$_3$ and the like.

As used herein, the term "cycloalkyl" refers to a non-aromatic mono or multicyclic ring system having 3 to 12 carbon atoms, such as (C$_3$-C$_{10}$)cycloalkyl, (C$_3$-C$_6$)cycloalkyl, cyclopropyl, cyclobutyl, cyclopentyl, cyclohexyl and the like. Examples of multicyclic cycloalkyl groups include, but are not limited to, perhydronaphththyl, adamantyl and norbornyl groups, bridged cyclic groups or spirobicyclic groups, e.g., spiro(4,4)non-2-yl and the like.

As used herein, the term "aryl" refers to an aromatic radical having 6- to 14-carbon atoms, including monocyclic, bicyclic and tricyclic aromatic systems, such as phenyl, naphthyl, tetrahydronaphthyl, indanyl, and biphenyl and the like.

As used herein, the term "heterocyclic ring" or "heterocyclyl ring" or "heterocyclyl", unless otherwise specified, refers to substituted or unsubstituted non-aromatic 3- to 15-membered ring which consists of carbon atoms and with one or more heteroatom(s) independently selected from N, O or S. The heterocyclic ring may be a mono-, bi- or tricyclic ring system, which may include fused, bridged or spiro ring systems and the nitrogen, carbon, oxygen or sulfur atoms in the heterocyclic ring may be optionally oxidized to various oxidation states. In addition, the nitrogen atom may be optionally quaternized, the heterocyclic ring or heterocyclyl may optionally contain one or more olefinic bond(S), and one or two carbon atoms(S) in the heterocyclic ring or heterocyclyl may be interrupted with —CF$_2$—, —C(O)—, —S(O)—, S(O)$_2$ etc. in addition, heterocyclic ring may also be fused with aromatic ring. Non-limiting Examples of heterocyclic rings include azetidinyl, benzopyranyl, chromanyl, decahydroisoquinolyl, indolinyl, isoindolinyl, isochromanyl, isothiazolidinyl, isoxazolidinyl, morpholinyl, oxazolinyl, oxazolidinyl, 2-oxopiperazinyl, 2-oxopiperidinyl, 2-oxopyrrolidinyl, 2-oxoazepinyl, octahydroindolyl, octahydroisoindolyl, perhydroazepinyl, piperazinyl, 4-piperidonyl, pyrrolidinyl, piperidinyl, phenothiazinyl, phenoxazinyl, quinuclidinyl, tetrahydroisoquinolyl, tetrahydrofuryl, tetrahydropyranyl, thiazolinyl, thiazolidinyl, thiamorpholinyl, thiamorpholinylsulfoxide, thiamorpholinylsulfoneindoline, benzodioxole, tetrahydroquinoline, tetrahydrobenzopyran and the like. The heterocyclic ring may be attached by any atom of the heterocyclic ring that results in the creation of a stable structure.

As used herein, the term "heteroaryl" unless otherwise specified, refers to a substituted or unsubstituted 5- to 14-membered aromatic heterocyclic ring with one or more heteroatom(S) independently selected from N, O or S. The heteroaryl may be a mono-, bi- or tricyclic ring system. The heteroaryl ring may be attached by any atom of the heteroaryl ring that results in the creation of a stable structure. Non-limiting Examples of a heteroaryl ring include oxazolyl, isoxazolyl, imidazolyl, fury, indolyl, isoindolyl, pyrrolyl, triazolyl, triazinyl, tetrazolyl, thienyl, thiazolyl, isothiazolyl, pyridyl, pyrimidinyl, pyrazinyl, pyridazinyl, benzofuranyl, benzothiazolyl, benzoxazolyl, benzimidaxolyl, benzothienyl, carbazolyl, quinolinyl, isoquinolinyl, quinazolinyl, cinnolinyl, naphthyridinyl, pteridinyl, purinyl, quinoxalinyl, quinolyl, isoquinolyl, thiadiazolyl, indolizinyl, acridinyl, phenazinyl, phthalazinyl and the like.

The compounds of the invention may have one or more chiral centers. The absolute stereochemistry at each chiral center may be 'R' or 'S'. The compounds of the invention include all diastereomers and enantiomers and mixtures thereof. Unless specifically mentioned otherwise, reference to one stereoisomer applies to any of the possible stereoisomers. Whenever the stereoisomeric composition is unspecified, it is to be understood that all possible stereoisomers are included.

As used herein, the term "stereoisomer" refers to a compound made up of the same atoms bonded by the same bonds but having different three-dimensional structures which are not interchangeable. The three-dimensional structures are called configurations. As used herein, the term "enantiomer" refers to two stereoisomers whose molecules are non-superimposable mirror images of one another. The term "chiral center" refers to a carbon atom to which four different groups are attached. As used herein, the term "diastereomers" refers to stereoisomers which are not enantiomers. The terms "racemate" or "racemic mixture" refer to a mixture of equal parts of enantiomers.

As used herein, the term "tautomer" refers to a compound that undergoes rapid proton shifts from one atom of the compound to another atom of the compound. Some of the compounds described herein may exist as tautomers with different points of attachment of hydrogen. The individual tautomers as well as mixture thereof are encompassed with compounds of formula (I).

As used herein, the term "treating" or "treatment" of a state, disorder or condition includes: (a) preventing or delaying the appearance of clinical symptoms of the state, disorder or condition developing in a subject that may be afflicted with or predisposed to the state, disorder or condition but does not yet experience or display clinical or subclinical symptoms of the state, disorder or condition; (b) inhibiting the state, disorder or condition, i.e., arresting or reducing the development of the disease or at least one clinical or subclinical symptom thereof; (c) lessening the disease, disorder or condition or at least one of its clinical or subclinical symptoms or (d) relieving the disease, i.e., causing regression or amelioration of the state, disorder or condition or at least one of its clinical or subclinical symptoms.

As used herein, the terms "treat," "ameliorate," and "inhibit," as well as words stemming therefrom, as used herein, do not necessarily imply 100% or complete treatment, amelioration, or inhibition. Rather, there are varying degrees of treatment, amelioration, and inhibition of which one of ordinary skill in the art recognizes as having a potential benefit or therapeutic effect. In this respect, the disclosed methods can provide any amount of any level of treatment, amelioration, or inhibition of the disorder in a mammal. For example, a disorder, including symptoms or conditions thereof, may be reduced by, for example, 100%, 90%, 80%, 70%, 60%, 50%, 40%, 30%, 20%, or 10%. Furthermore, the treatment, amelioration, or inhibition provided by the inventive method can include treatment, amelioration, or inhibition of one or more conditions or symptoms of the disorder, e.g., cancer. Also, for purposes herein, "treatment," "amelioration," or "inhibition" can encompass delaying the onset of the disorder, or a symptom or condition thereof.

As used herein, the term "inhibitor" refers to a molecule that binds to an enzyme to inhibit the activity of the said enzyme either partially or completely.

As used herein, the terms "patient" and "subject" are interchangeable and can be taken to mean any living organism that can be treated with the pharmaceutical combinations disclosed herein. The terms "patient" and "subject" include mammals (such as primate or human) and other animals, such as domestic animals (e.g., household pets including cats and dogs) and non-domestic animals (such as wildlife).

As used herein, a "therapeutically effective amount" means the amount of a compound that, when administered to a subject for treating a disease, disorder or condition, is sufficient to cause the effect in the subject, which is the purpose of the administration. The "therapeutically effective amount" will vary depending on the compound, route of administration, the disease and its severity and the age, weight, physical condition and responsiveness of the subject to be treated.

As used herein, a "pharmaceutically acceptable carrier" refers to an ingredient in a pharmaceutical formulation, other than an active ingredient, which can be safely administered to a subject. A pharmaceutically acceptable carrier includes, but is not limited to, a buffer, excipient, stabilizer, or preservative. Suitable carriers and diluents include buffered, aqueous solutions, saline, dextrose, glycerol, isotonic saline solutions, for example phosphate-buffered saline, isotonic water, and the like and combinations thereof. In some embodiments, carriers may include propylene glycol, dimethyl isosorbide, and water, and even more particularly, phosphate buffered saline, isotonic water, deionized water, monofunctional alcohols and symmetrical alcohols.

As used herein, the term "tumor" refers to all neoplastic cell growth and proliferation, whether malignant or benign, and all pre-cancerous and cancerous cells and tissues. The terms "cancer," "cancerous," "cell proliferative disorder," "proliferative disorder," and "tumor" are not mutually exclusive as referred to herein.

As used herein, the phrase "pharmaceutically acceptable salt" refers to pharmaceutically acceptable organic, or inorganic, salts of a compound of the invention. Exemplary salts include, but are not limited to, sulfate, citrate, acetate, oxalate, chloride, bromide, iodide, nitrate, bisulfate, phosphate, acid phosphate, isonicotinate, lactate, salicylate, acid citrate, tartrate, oleate, tannate, pantothenate, bitartrate, ascorbate, succinate, maleate, gentisinate, fumarate, gluconate, glucuronate, saccharate, formate, benzoate, glutamate, methanesulfonate "mesylate," ethanesulfonate, bemmnesulfonate, p-toluenesulfonate, and pamoate (i.e., 1,1'-methylene-bis(2-hydroxy-3-naphthoate)) salts. A pharmaceutically acceptable salt may involve the inclusion of another molecule, such as an acetate ion, a succinate ion, or other counter ion. In some embodiments, the counter ion is any organic, or inorganic, moiety that stabilizes the charge on the parent compound. Furthermore, a pharmaceutically acceptable salt may have more than one charged atom in its structure. Instances where multiple charged atoms are part of the pharmaceutically acceptable salt can have multiple counter ions. Hence, a pharmaceutically acceptable salt can have one or more charged atoms and/or one or more counter ion.

In some embodiments, when the compound of the invention is a base, the desired pharmaceutically acceptable salt is prepared by any suitable method available in the art, e.g., treatment of the free base with an inorganic acid, such as hydrochloric acid, hydrobromic acid, sulfuric acid, nitric acid, methanesulfonic acid, phosphoric acid and the like, or with an organic acid, such as acetic acid, trifluoroacetic acid, maleic acid, succinic acid, mandelic acid, fumaric acid, malonic acid, pyruvic acid, oxalic acid, glycolic acid, salicylic acid, a pyranosidyl acid, such as glucuronic acid or galacturonic acid, an alpha hydroxy acid, such as citric acid or tartaric acid, an amino acid, such as aspartic acid or glutamic acid, an aromatic acid, such as benzoic acid or cinnamic acid, a sulfonic acid, such as p-toluenesulfonic acid or ethanesulfonic acid, or the like.

In some embodiments, when the compound of the invention is an acid, the desired pharmaceutically acceptable salt is prepared by any suitable method, e.g., treatment of the free acid with an inorganic or organic base, such as an amine (primary, secondary or tertiary), an alkali metal hydroxide or alkaline earth metal hydroxide, or the like. Illustrative examples of suitable salts include, but are not limited to, organic salts derived from amino acids, such as glycine and arginine, ammonia, primary, secondary, and tertiary amines, and cyclic amines, such as piperidine, morpholine and piperazine, and inorganic salts derived from sodium, calcium, potassium, magnesium, manganese, iron, copper, zinc, aluminum and lithium.

As used herein, the term "solvate" refers to an association, or complex, of one or more solvent molecules and a compound of the invention. Examples of solvents that form solvates include, but are not limited to, water, isopropanol, ethanol, methanol, DMSO, ethylacetate, acetic acid, and ethanolamine.

Compositions

In some embodiments, the EGFR inhibitors that can be used along with PRMT5 Inhibitors of Formula (I) can include or exclude Afatinib, Osimertinib, Erlotinib or Gefitinib or any other agent that inhibits activity of the enzymes EGFR or its oncogenic variants.

In some embodiments, the CDK4/6 inhibitors that can be used along with PRMT5 Inhibitors of Formula (I) can include or exclude Palbociclib, Ribociclib or Abemaciclib or any other agent that inhibits activity of the enzymes CDK4 and CDK6.

In some embodiments, the RAF inhibitors that can be used along with PRMT5 Inhibitors of Formula (I) can include or exclude Dabrafenib, Regorafenib, Encorafenib or pan-RAF inhibitors such as RAF265 or any other agent that inhibits activity of the RAF isoforms (ARAF, BRAF and CRAF).

In some embodiments, the ERK inhibitors that can be used along with PRMT5 Inhibitors of Formula (I) can include or exclude Ulixertinib, MK-8353 or ravoxertinib or any other agent that inhibits activity of the ERK1/2 kinases.

In some embodiments, the SOS1 inhibitors that can be used along with PRMT5 Inhibitors of Formula (I) can include or exclude BI-3406.

In some embodiments, the MALT1 inhibitors that can be used along with PRMT5 Inhibitors of Formula (I) can include or exclude MI-2 or JNJ-6785663.

In some embodiments, the BTK inhibitors that can be used along with PRMT5 Inhibitors of Formula (I) can include or exclude ibrutinib, zanubrutinib or acalabrutinib.

In some embodiments, the PI3K inhibitors that can be used along with PRMT5 Inhibitors of Formula (I) can include or exclude Alpelisib, Copanlisib, Duvelisib, BEZ- 235, Gedatolisib, Buparlisib or agents that inhibits the activity of one or more PI3K isoforms (a, β, δ and γ) or PI3K-mTOR dual inhibitors.

In some embodiments, the AKT inhibitors that can be used along with PRMT5 Inhibitors of Formula (I) can include or exclude GSK690693, AZD5363, or Ipatasertib.

In some embodiments, the FGFR inhibitors that can be used along with PRMT5 Inhibitors of Formula (I) can include or exclude Dovitinib, AZD4547, BGJ398, or JNJ 42756493.

In some embodiments, the c-Met inhibitors that can be used along with PRMT5 Inhibitors of Formula (I) can include or exclude Tivantinib, Cabozantinib, Crirotinib, or Capmatinib.

In some embodiments, the KRAS inhibitors and KRAS-G12C inhibitors that can be used along with PRMT5 Inhibitors of Formula (I) can include or exclude Sotorasib (AMG510), JNJ74699157 or GDC-6036.

In some embodiments, the MEK inhibitors that can be used along with PRMT5 Inhibitors of Formula (I) can include or exclude cobimetinib, Trametinib, SF-2626.

In some embodiments, the Bcl-2 inhibitors, that can be used along with PRMT5 Inhibitors of Formula (I) can include or exclude Navitoclax, Venetoclax, AZD-4320, Alvocidib hydrochloride, TP-1287, APG-2575.

In some embodiments, the Type 1 PRMT inhibitors that can be used along with PRMT5 Inhibitors of Formula (I) can include or exclude GSK-3368715.

In some embodiments, the MAT2A inhibitors that can be used along with PRMT5 inhibitors of Formula (I) can include or exclude AG24512 or AG25696

In some embodiments, the STING agonists that can be used along with PRMT5 Inhibitors of Formula (I) can include or exclude MK-1454, GSK-532, SYNB-1891, E-7766, or BMS-986301.

In some embodiments, the immune checkpoint inhibitors/modulators (immuno-oncology agents) that can be used along with PRMT5 inhibitors of Formula (I) can include or exclude Nivolumab, Ipilimumab, Pembrolizutnab, Ombunamab, Tremelimumab, Pidilirumab, Varlilumab, Epacadostat, CT-011, AMP-224, and MDX-1106. Checkpoint inhibiting agents are agents that target checkpoint proteins or a derivative thereof, and may be referred to as "checkpoint inhibitors." Checkpoint inhibitors can include or exclude proteins, polypeptides, amino acid residues, and monoclonal or polyclonal antibodies. The PRMT5 inhibitor compounds can be administered along with one or more checkpoint inhibitors. The checkpoint inhibitors can bind, for example, to ligands or proteins that are found on any of the family of T cell regulators, such CD28/CTLA-4. Targets of checkpoint inhibitors include, but are not limited to, receptors or co-receptors (e.g., CTLA-4; CDS) expressed on immune system effector or regulator cells (e.g., T cells); proteins expressed on the surface of antigen-presenting cells (e.g., expressed on the surface of activated T cells, including PD-1, PD-2, PD-L1 PD-L2, 4-1 BB, and OX40); metabolic enzymes or metabolic enzymes that are expressed by both tumor and tumor-infiltrating cells (e.g., indoleamine (IDO), including isoforms, such as IDO1 and IDO2); proteins that belong to the immunoglobulin superfamily (e.g., lymphocyte-activation gene 3, also known as LAG3); proteins that belong to the B7 superfamily (e.g., B7-H3 or homologs thereof). B7 proteins can be found on both activated antigen presenting cells and T cells.

Methods

In in some embodiments of the present invention, there is provided the use of a pharmaceutical combination comprising a PRMT5 Inhibitor of Formula (I), and at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitora BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator, or a pharmaceutically acceptable salt thereof for the manufacture of a medicament for use in the treatment of a disease or condition in which inhibition of a PRMT5 protein inhibition is beneficial.

In some embodiments, this disclosure provides for a method of treating and/or preventing cancer in a human subject in need thereof, the method comprising administering to the human subject a pharmaceutical combination comprising a composition a PRMT5 Inhibitor of Formula (I), and at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT inhibitor, a BTK inhibitor, MAT2A inhibitor, a PI3K inhibitor, a AKT inhibitors BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator. The disease cancer can be glioblastoma multiforme, prostate cancer, pancreatic cancer, mantle cell lymphoma, non-Hodgkin's lymphomas and diffuse large B-cell lymphoma, acute myeloid leukemia, acute lymphoblastic leukemia, multiple myeloma, non-small cell lung cancer, small cell lung cancer, breast cancer, triple negative breast cancer, gastric cancer, colorectal cancer, ovarian cancer, bladder cancer, hepatocellular cancer, melanoma, sarcoma, oropharyngeal squamous cell carcinoma, chronic myelogenous leukemia, epidermal squamous cell carcinoma, nasopharyngeal carcinoma, neuroblastoma, or endometrial carcinoma, or cervical cancer.

In some embodiments the invention provides a method of treating and/or preventing cancer in a subject in need thereof. In some embodiments, the invention provides for a method for reducing tumor growth rate, reducing the size of a tumor, reducing one or more symptoms associated with having a tumor in a subject in need thereof, or eliminating the tumor. The cancer can also include or exclude solid tumors, leukemias or lymphomas.

Administration

In some embodiments, the pharmaceutical combination provided herein can comprise a combination of a PRMT5 Inhibitor of Formula (I), and at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitora BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator, are administered by any route appropriate to the condition to be treated. Suitable routes can include or exclude oral, parenteral (including subcutaneous, intramuscular, intravenous, intraarterial, intradermal, intrathecal and epidural), intraperitoneal (IP), transdermal, rectal, nasal, topical (including buccal and sublingual), vaginal, intrapulmonary and intranasal. In some embodiments, for local treatment, the compounds are administered by intratumor administration, including perfusing or otherwise contacting the tumor with the inhibitor. It will be appreciated that the preferred route may vary with, e.g., the condition of the recipient/subject. In some embodiments, where the compound is administered orally, it is formulated as a pill, capsule, tablet, etc., with a pharmaceutically acceptable carrier and/or excipient. In some embodiments, where the compound is administered parenterally, it is formulated with a pharmaceutically acceptable parenteral vehicle, and in a unit dosage injectable form, as described herein.

Suitable doses and dosage regimens can be determined by range-finding techniques which are a function of the subjects mass, body volume, body surface area, regions of administrator, routes of administration, and the degree of cancer prognosis of the subject. Generally, treatment is initiated with smaller dosages that are less than the optimum dose of the composition of the present invention. Thereafter, the dosage is increased by small increments until the optimum effect under the circumstances is reached. The present method can involve the administration of about 0.1 μg to about 50 mg of at least one compound of the invention per kg body weight of the subject. For example, for a 70 kg patient, dosages of from about 10 μg to about 200 mg of the compound can be used, depending on a patient's physiological response.

In some embodiments, the dose of the pharmaceutically active substances described herein for methods of treating and/or preventing a cancer as described herein can be about 0.001 to about 1 mg/kg body weight of the subject per day, for example, about 0.001 mg, 0.002 mg, 0.005 mg, 0.010 mg, 0.015 mg, 0.020 mg, 0.025 mg, 0.050 mg, 0.075 mg, 0.1 mg, 0.15 mg, 0.2 mg, 0.25 mg, 0.5 mg, 0.75 mg, or 1 mg/kg body weight per day. The dose of the pharmaceutically active agent(s) described herein for the described methods can be about 1 to about 1000 mg/kg body weight of the subject being treated per day, for example, about 1 mg, 2 mg, 5 mg, 10 mg, 15 mg, 0.020 mg, 25 mg, 50 mg, 75 mg, 100 mg, 150 mg, 200 mg, 250 mg, 500 mg, 750 mg, or 1000 mg/kg body weight per day.

In some embodiments, the dose of the PRMT5 Inhibitor of Formula (I) within the pharmaceutical combination for methods of treating and/or preventing a cancer as described herein can be administered at doses of 1 mg/kg per day, about 2 mg/kg per day, about 5 mg/kg per day, about 10 mg/kg per day, about 15 mg/kg per day, about 20 mg/kg per day, about 25 mg/kg per day, about 31) mg/kg per day, about 35 mg/kg per day, about 40 mg/kg per day, about 45 mg/kg per day, about 50 mg/kg per day, about 60 mg/kg per day, about 70 mg/kg per day, about 140 mg/kg per day, about 90 mg/kg per day, about 100 mg/kg per day, about 125 mg/k per day, about 150 mg/kg per day, about 175 mg/kg per day, about 200 mg/kg per day, about 250 mg/kg per day, or about 300 mg/kg per day, in combination with EGFR inhibitor that can be administered at doses of about 1 mg/kg per day, about 2 mg/kg per day, about 5 mg/kg per day, about 10 mg/kg per day, about 15 mg/kg per day, about 20 mg/kg per day, about 25 mg/kg per day, about 30 mg/kg per day, about 35 mg/kg per day, about 40 mg/kg per day, about 45 mg/kg per day, about 50 mg/kg per day, about 60 mg/kg per day, about 70 mg/kg per day, about 80 mg/kg per day, about 90 mg/kg per day, about 100 mg/kg per day, about 125 mg/kg per day, about 150 mg/kg per day, about 175 mg/kg per day, about 200 mg/kg per day, about 250 mg/kg per day, or about 300 mg-kg per day.

In some embodiments, the dose of the PRMT5 Inhibitor of Formula (I) within the pharmaceutical combination for methods of treating and/or preventing a cancer as described herein can be administered at doses of 1 mg/kg per day, about 2 mg/kg per day, about 5 mg/kg per day, about 10 mg/kg per day, about 15 mg/kg per day, about 20 mg/kg per day, about 25 mg/kg per day, about 30 mg/kg per day, about 35 mg/kg per day, about 40 mg/kg per day, about 45 mg/kg per day, about 50 mg/kg per day, about 60 mg/kg per day, about 70 mg/kg per day, about 80 mg/kg per day, about 90 mg/kg per day, about 100 mg/kg per day, about 125 mg/k per day, about 150 mg/kg per day, about 175 mg/kg per day, about 200 mg/kg per day, about 250 mg/kg per day, or about 300 mg/kg per day, in combination with SOS1 inhibitor that can be administered at doses of about 1 mg/kg per day, about 2 mg/kg per day, about 5 mg/kg per day, about 10 mg/kg per day, about 15 mg/kg per day, about 20 mg/kg per day, about 25 mg/kg per day, about 30 mg/kg per day, about 35 mg/kg per day, about 40 mg/kg per day, about 45 mg/kg per day, about 50 mg/kg per day, about 60 mg/kg per day, about 70 mg/kg per day, about 80 mg/kg per day, about 90 mg/kg per day, about 100 mg/kg per day, about 125 mg/k per day, about 150 mg/kg per day, about 175 mg/kg per day, about 200 mg/kg per day, about 250 mg/kg per day, or about 300 mg/kg per day.

In some embodiments, the dose of the PRMT5 Inhibitor of Formula (I) within the pharmaceutical combination for methods of treating and/or preventing a cancer as described herein for methods of treating and/or preventing a disease or condition as described above PRMT5 can be administered at doses of 1 mg/kg per day, about 2 mg/kg per day, about 5 mg/kg per day, about 10 mg/kg per day, about 15 mg/kg per day, about 20 mg/kg per day, about 25 mg/kg per day, about 30 mg/kg per day, about 35 mg/kg per day, about 40 mg/kg per day, about 45 mg/kg per day, about 50 mg/kg per day, about 60 mg/kg per day, about 70 mg/kg per day, about 80 mg/kg per day, about 90 mg/kg per day, about 100 mg/kg per day, about 125 mg/k per day, about 150 mg/kg per day, about 175 mg/kg per day, about 200 mg/kg per day, about 250 mg/kg per day, or about 300 mg/kg per day, in combination with ERK inhibitor that can be administered at doses of about 1 mg/kg per day, about 2 mg/kg per day, about 5 mg/kg per day, about 10 mg/kg per day, about 15 mg/kg per day, about 20 mg/kg per day, about 25 mg/kg per day, about 30 mg/kg per day, about 35 mg/kg per day, about 40 mg/kg per day, about 45 mg/kg per day, about 50 mg/kg per day, about 60 mg/kg per day, about 70 mg/kg per day, about 80 mg/kg per day, about 90 mg/kg per day, about 100 mg/kg per day, about 125 mg: k per day, about 150 mg/kg per day, about 175 mg/kg per day, about 200 mg/kg per day, about 250 mg/kg per day, or about 300 mg/kg per day.

In some embodiments, the pharmaceutical combinations of this disclosure can be administered systemically, such as by intravenous, infra-arterial or intraperitoneal administration, such that the final circulating concentration of the PRMT5 Inhibitor compounds of formula (I) is from approximately 0.001 to approximately 150 micromolar, or higher up to 200 micromolar, 300 micromolar, 400 micromolar, 500 micromolar, 600 micromolar, 700 micromolar, 800 micromolar, 900 micromolar or 1000 micromolar. The final circulating concentration can be (all in micromolar) 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4, 6, 4.7, 4.8, 4, 9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 100, 110, 120, 130, 140, or 150 micromolar, or any concentration between any of the two recited numbers, or higher as described above and any concentration within the ranges noted. Skilled persons will appreciate desirable dosages for the one or more active agent having regard to the nature of that agent and the principles discussed herein before.

In some embodiments, this disclosure provides for a method of administering of a PRMT5 Inhibitor of Formula (I), simultaneously, concurrently, sequentially, successively, alternately or separately with at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitors BTK inhibitor, MAT2A inhibitor, a PI3K inhibitor, a AKT inhibitor, a FGFR inhibitor, a Type 1 PRMT inhibitor, a STING agonist, or an immune checkpoint inhibitor/modulator.

Co-administration of a PRMT5 Inhibitor of Formula (I), and at least one targeted agent/cellular activity modulator selected from an EGFR inhibitor, a KRAS inhibitor, a KRAS-G12C inhibitor, a MEK inhibitor, a Bcl-2 inhibitor, a SOS inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitors BTK inhibitor, MAT2A inhibitor, a PI3K inhibitor, a AKT inhibitor, a FGFR inhibitor, a Type 1 PRMT inhibitor, a STING agonist, or an immune checkpoint inhibitor/modulator may allow for improved alleviation or amelioration of one or more symptoms, reduction of the length or extent of a disease, delay or slowing of the progression of disease, amelioration, palliation or stabilization of the disease state, partial or complete remission, prolonged survival and/or other beneficial therapeutic results. Such treatments may be administered simultaneously or sequentially in any order with a period of time between administrations. One of skill in the art will readily appreciate methods of administering agents or therapies simultaneously, alternatively, or sequentially and possible time periods between administrations. When the PRMT5 Inhibitor compounds are administered at different times from the other cellular activity modulator as described herein, they may be administered within, for example, 30 minutes, 1 hour, 2 hours, 3 hours, 4 hours, 5 hours, 6 hours, 7 hours, 8, hours, 9, hours, 10 hours, 11 hours, 1 day, 2 days, 3 days, 4 days, 5 days, 6 days, 1 week, 2 weeks, 3 weeks or 1 month pan, or any time interval between any two of the recited time periods. Doses may be administered QD, BID, TID, QID, or in weekly doses, e.g., QIW, BIW, QW. They may also be administered PRN, and hora samni.

In some embodiments, treatment according to the invention may involve the administration of pharmaceutical combinations comprising a PRMT5 Inhibitor of Formula (I), and at least one targeted agent/cellular activity modulator selected from an EGFR inhibitor, a KRAS inhibitor, a KRAS-G12C. inhibitor, a MEK inhibitor, a Bcl-2 inhibitor, a SOS1 inhibitor, a PARP inhibitor, a RAF inhibitor, a ERK inhibitor, a CDK416 inhibitor, a MALT1 inhibitor, a BTK inhibitor, MAT2A inhibitor, a PI3K inhibitor, a AKT inhibitora BTK inhibitor, MAT2A inhibitor, a PI3K inhibitor, a AKT inhibitor, a FGFR inhibitor, a Type 1 PRMT inhibitor, a STING agonist, or an immune checkpoint inhibitor/modulator to a human subject. For example, the pharmaceutical combinations described herein can be used in the preparation of a medicament for use in promoting the general health of a subject, or reducing one or more side-effects of cancer therapy. Skilled persons will readily appreciate various agents which may be beneficial to administer having regard to the disease to be treated, for example. In some embodiments where a compound of a PRMT5 Inhibitor compound of Formula (I) is initially co-administered with a at least one targeted agent % cellular activity modulator selected from an EGFR inhibitor, a KRAS inhibitor, a KRAS-012C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitora BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator, the administration of the compound of Formula (I) thereof may be stopped or tapered, while administration of the at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitora BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator continues.

Administration of a PRMT5 Inhibitor compound of Formula (I), and at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitora BTK inhibitor, MAT2A inhibitor, a PI3K inhibitor, a AKT inhibitor, a FGFR inhibitor, a Type 1 PRMT inhibitor, a STING agonist, or an immune checkpoint inhibitor/modulator, may occur at any time during the progression of a disease or disorder, or prior to or after the development of a disorder or one or more symptom of a disease or disorder. In one embodiment, a PRMT5 Inhibitor compound of Formula (I), and at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator, is administered on a daily basis for an extended period to assist with ongoing management of symptoms. In another embodiment, a PRMT5 Inhibitor compound of Formula (I), and at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator, is administered on a daily basis for an extended period or to prevent or delay the development of a disease or disorder.

Synergistic/Enhanced Combination

The term "synergistic" as used herein refers to a therapeutic combination which is more effective than the additive effects of the two or more single agents. The combination therapy may provide "synergy" and prove "synergistic", i.e., the effect achieved when the active ingredients used together is greater than the sum of the effects that results from using the compounds separately. A synergistic effect may be attained when the active ingredients are: (1) co-formulated and administered or delivered simultaneously in a combined, unit dosage formulation; or (2) delivered by alternation as separate formulations. When delivered in alternation therapy, a synergistic effect may be attained when the compounds are administered or delivered sequentially, e.g., by different injections in separate syringes. In general, during alternation therapy, an effective dosage of each active ingredient is administered sequentially, i.e., serially in time. In some embodiments, the synergy is evidenced by a lower toxicity of the composition compared to the same dose of any single component at the same total dosage amount. For example, when a PRMT5 Inhibitor compound of Formula (I) is co-administered with a cellular activity modulator as described herein, the toxicity of a 50:50 (w/w) composition comprising the PRMT5 Inhibitor compound and a cellular activity modulator as described herein is less than the toxicity of a 100% (w/w) PRMT5 Inhibitor compound, or of a 100% (w/w) cellular activity modulator, wherein the compositions have about the same level of efficacy. Not intended to be bound by theory, the inventors have recognized that while a PRMT5 Inhibitor compound may be metabolized by a first set of metabolic enzymes, the at least one targeted agent/cellular activity modulator selected from an EGFR inhibitor, a KRAS inhibitor, a KRAS-G12C inhibitor, a MEK inhibitor, a Bcl-2 inhibitor, a SOS inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator may be metabolized by a second set of enzymes, such that the first set of enzymes and the second set of enzymes are not entirely the same. The result is that the toxicity of the combination will be less than those of the single components of the combination, or that the efficacy of the combination will be more than those of the single components of the combination. The rationale for combining two or more anticancer therapies is not only to reduce toxicity and impart more safety but also to enhance efficacy more than that offered by the single agent alone. The increase in efficacy is one of the benefits of combination therapy. The combinations are designed to target cellular signaling mechanisms such that multiple oncogenic pathways can be addressed concomitantly eventually leading to enhanced anticancer activity and/or efficacy (tumor growth inhibition). The analysis of the examples discussed herein demonstrates an improved anticancer effect both in vitro and in vim, clearly exemplifying the advantages of combining Compound-24 with other cellular activity modulators.

In measuring in viva or therapeutic synergy, one measure of synergy is known as "Excess over Highest Single Agent" Synergy. Excess over Highest Single Agent Synergy occurs where a combination of fixed doses is such that it is superior to both of its component doses then this is called "excess over highest single agent."

An effective amount of a compound (or a pharmaceutically acceptable salt thereof) may be understood to comprise an amount sufficient to prevent or inhibit the growth of tumor cells or the progression of cancer metastasis in the combination of the invention. Therapeutic or pharmacological effectiveness of the doses and administration regimens may also be characterized as the ability to induce, enhance, maintain or prolong remission in patients experiencing specific tumors.

Manufacture and Stability

In some embodiments, the formulations of this invention are substantially pure. By substantially pure is meant that the formulations comprise less than about 10%, 5%, or 1%, and preferably less than about 0.1%, of any impurity. In some embodiments the total impurities, including metabolites of the compounds of the PRMT5 Inhibitors of Formula (I) will be not more than 15%. In some embodiments the total impurities, including metabolites of: the compounds of the PRMT5 Inhibitors of Formula (I), will be not more than 12%. In some embodiments the total impurities, including metabolites of the compounds of the PRMT5 Inhibitors of Formula (I), will be not more than 11%. In other embodiments the total impurities, including metabolites of compounds of the PRMT5 Inhibitors of Formula (I), will be not more than 10%.

In some embodiments, the purity of the formulations of this invention may be measured using a method selected from anion exchange HPLC (AEX-HPLC) or mass spectrometry. Mass spectrometry may include LC/MS, or LC/MS/MS. In some embodiments, the method used to measure the impurity may comprise both AEX-HPLC and LC/MS.

Sterile compositions comprising the compounds of the PRMT5 Inhibitors of Formula (I) or pharmaceutically acceptable salts thereof of this invention prepared using aseptic processing by dissolving the compound in the formulation vehicle. In one embodiment, the formulation may also be sterilized by filtration. Excipients used in the manufacture of the formulations of this invention are widely used in pharmaceutical products and released to pharmacopeia) standards.

Formulations

The compounds of a PRMT5 Inhibitor compound of Formula (I) may be present in the pharmaceutical formulation in a substantially isolated form. It will be understood that the product may be mixed with carriers or diluents that will not interfere with the intended purpose of the product and still be regarded as substantially isolated. A product of the invention may also be in a substantially purified form, in which case it will generally comprise about 80%, 85%, or 90%, e.g., at least about 88%, at least about 90, 95 or 98%, or at least about 99% of a compound of Formula (I) or at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator.

Pharmaceutically acceptable diluents, carriers and/or excipients include those suitable for veterinary use as well as human pharmaceutical use. Suitable carriers and/or excipients will be readily appreciated by persons of ordinary skill in the art, having regard to the nature of compounds of Formula (I) or the other cellular activity modulator. However, by way of example, diluents, carriers and/or excipients include solutions, solvents, dispersion media, delay agents, polymeric and lipidic agents, emulsions and the like. By way of further example, suitable liquid carriers, especially for injectable solutions, include water, aqueous saline solution, aqueous dextrose solution, and the like, with isotonic solutions being preferred for intravenous, intraspinal, and intracisternal administration and vehicles such as liposomes being also especially suitable for administration of agents.

In addition, if desired substances such as wetting or emulsifying agents, stabilizing or pH buffering agents, or preservatives may also be present in the pharmaceutical combinations of the invention. In some embodiments, the pharmaceutical combinations of this invention will comprise suitable pharmaceutically acceptable buffers, such as acetate buffers, citrate buffers, phosphate buffers, borate buffers and mixtures thereof. In some embodiments, the buffers useful in the present invention include boric acid, sodium borate, sodium phosphates, including mono, di- and tri-basic phosphates, such as sodium phosphate monobasic monohydrate and sodium phosphate dibasic heptahydrate, and mixtures thereof, to some embodiments, the preservative may be stabilized chlorine dioxide, cationic polymers or quaternary ammonium compounds. In some embodiments the pharmaceutical combinations may also comprise wetting agents, nutrients, viscosity builders, antioxidants, and the like, for example, disodium ethylene diamine tetraacetate, alkali metal hexametaphosphate, citric acid, sodium citrate, sodium metabisulfite, sodium thiosulfate. N-acetylcysteine, butylated hydroxyanisole, butylated hydroxytoluene, polyvinyl alcohol, polyoxamers, polyvinyl pyrrollidone, hydroxypropyl methyl cellulose, hydroxyethylmethyl cellulose, and mixtures thereof and mixtures thereof, in some embodiments, the pharmaceutical formulations of this invention will not include a preservative.

In some embodiments, the pharmaceutical combinations of this disclosure are in the form of a sterile injectable preparation, such as a sterile injectable aqueous or oleaginous suspension. In some embodiments, the suspension is formulated according to methods using those suitable dispersing or wetting agents and suspending agents which have been mentioned above. The sterile injectable preparation may also be a sterile injectable solution or suspension in a non-toxic parenterally acceptable diluent or solvent, such as a solution in 1,3-butanediol prepared as a lyophilized powder. In some embodiments, the acceptable vehicles and solvents that are employed can include or exclude: water, Ringer's solution (including Ringer's lactate solution), Hartmann's solution, Tyrode's solution, and isotonic sodium chloride solution. In some embodiments, sterile fixed oils are employed as a solvent or suspending medium. For this purpose, any bland fixed oil is employed including synthetic mono- or diglycerides. In some embodiments, fatty acids such as oleic acid is used in the preparation of injectables.

Compositions of the invention may contain any appropriate level of PRMT5 Inhibitor compounds of Formula (I) or at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator, having regard to the dosage form and mode of administration. However, by way of example, compositions of use in the invention may contain from approximately 0.1% to approximately 99% by weight, preferably from approximately 1% to approximately 60% by weight, of PRMT5 Inhibitor compounds of Formula (I), depending on the method of administration.

In addition to standard diluents, carriers and/or excipients, a composition in accordance with the invention may be formulated with one or more additional constituents, or in such a manner, so as to enhance the activity or bioavailability of compounds of Formula (I) the at least one targeted agent/cellular activity modulator selected from an EGFR inhibitor, a KRAS inhibitor, a KRAS-G12C inhibitor, a MEK inhibitor, a Bcl-2 inhibitor, a SOS1 inhibitor, a PARP inhibitor, a RAF inhibitor, a ERK inhibitor, a CDK4/6 inhibitor, a MALT1 inhibitor, a BTK inhibitor, MAT2A inhibitor, a PI3K inhibitor, a AKT inhibitor, a FGFR inhibitor, a Type I PRMT inhibitor, a STING agonist, or an immune checkpoint inhibitor/modulator, help protect the integrity or increase the half-life or shelf life thereof, enable slow release upon administration to a subject, or provide other desirable benefits, for example. For example, slow release vehicles include macromers, polyethylene glycol), hyaluronic acid, poly(vinylpyrrolidone), or a hydrogel. By way of further example, the compositions may also include preserving agents, solubilising agents, stabilising agents, wetting agents, emulsifying agents, sweetening agents, colouring agents, flavouring agents, coating agents, buffers and the like. Those of skill in the art to which the invention relates will readily identify further additives that may be desirable for a particular purpose.

The pharmaceutical combinations described herein may be formulated in accordance with standard techniques as may be found in such standard references as Gennaro AR: Remington: The Science and Practice of Pharmacy, 20th ed., Lippincott, Williams & Wilkins, 2000, for example.

EXAMPLES

The following examples are offered to illustrate but not to limit the methods described herein. Various modifications may be made by the skilled person.

Example 1

Materials

The compounds of this disclosure can be made and characterized by the methods described in PCT International Application Publication No. WO 2019116302, and as described herein. As a representative example, the synthesis of Compound-24 is as described below:

3-Chloro-7-(2-((3aS,4R,6aR)-4-(4-chloro-7H-pyrrolo[2,3-d]pyrimidin-7-yl)-2,2-dimethyl-3a,6a-dihydro-4H-cyclopenta[d][1,3]dioxol-6-ylethyl)-5-fluoroquinolin 2-amine

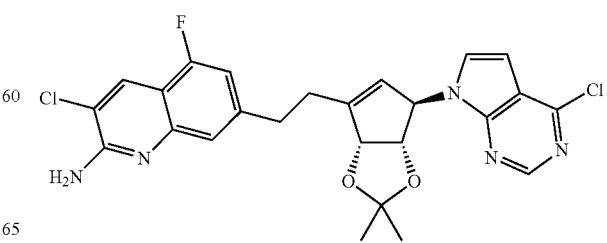

A mixture of 4-Chloro-7-((3aS,4R,6aR)-2,2-dimethyl-6-vinyl-3a,6a-dihydro-4H-cyclopenta[d][1,3]dioxol-4-yl)-7H-pyrrolo[2,3-d]pyrimidine (10.01 g, 31.5 mmol) (prepared as per procedure given in WO2019116302 page 116, line 2 to page 117, line 19), and 9-BBN (9-Borabicyclononane) (180 ml, 90 mmol) was heated at 50° C. for 1.15 h under $N_2$ atmosphere. The reaction mixture was cooled to room temperature and a solution of tripotassium phosphate (23.88 g, 113 mmol) in water (20 ml) was added and stirred for 30 min. Thereafter, a solution of 7-bromo-3-chloro-5-fluoroquinolin-2-amine (6.2 g, 22.50 mmol) in THF (20 ml) was added, followed by an addition of dichloro[1,1'-bis(di-t-butylphosphino)ferrocene]palladium(II) (1.467 g, 2.250 mmol). The resulting mixture was stirred at 50° C. for 3 h. The reaction mixture was quenched with water (100 ml) and extracted with EtOAc (200 ml). Layers were separated, an organic layer was washed with brine (100 ml), dried over sodium sulphate. The organic layer was filtered and concentrated in ram) to afford a crude compound. This residue was purified by combi-flash ($R_f$200, Teledyne/Isco) instrument onto a redisep $R_f$ column with gradient elution (0 to 40%)ethyl acetate in dichloromethane to furnish the title compound (6 g, 51.8%) as an off white solid. $^1$H NMR (400 MHz, DMSO-d6) δ 8.64 (s, 1H), 8.18 (d, J=0.7 Hz, 1H), 7.25 (s, 1H), 7.09-7.01 (m, 2H), 6.96 (s, 2H), 6.45 (d, J=3.7 Hz, 1H), 5.67 (s, 1H), 5.56-5.52 (m, 1H), 5.35 (d, J=5.8 Hz, 1H), 4.52 (d, J=5.7 Hz, 1H), 3.03 (hept, J=6.8 Hz, 2H), 2.65 (q, J=11.9, 8.6 Hz, 2H), 1.38 (s, 3H), 1.29 (s, 3H); LCMS m/z=515.07 (M+).

7-(2 ((3aS,4R,6aR)-4-(4-Amino-7H-pyrrolo[2,3-d]pyrimidin-7-yl)-2,2-dimethyl-3a,6a-dihydro-4H-cyclopenta[d][1,3]dioxol-6-yl)ethyl)-3-chloro-5-fluoroquinolin-2-amine

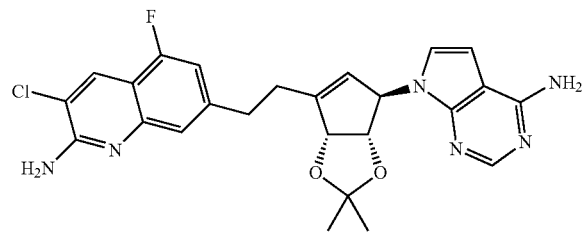 [SMILES: CC1(C)O[C@@H]2[C@H](O1)C(CCc1cc(F)c3cc(Cl)c(N)nc3c1)=C[C@H]2n1ccc2c(N)ncnc21]

To a stirred solution of 3-chloro-7-(2-((3aS,4R,6aR)-4-(4-chloro-7H-pyrrolo[2,3-d]pyrimidin-7-yl)-2,2-dimethyl-3a,6a-dihydro-414-cyclopenta[d][1,3]dioxol-6-yl)ethyl)-5-fluoroquinolin-2-amine (6 g, 11.66 mmol) in dioxane (60 ml) was added ammonium hydroxide (114 ml, 2916 mmol) at room temperature. The resulting mixture was stirred at 120° C. for 16 h in a steel bomb. The reaction mixture was diluted with water (100 ml) and extracted with EtOAc (100 ml). Layers were separated, an organic layer was washed with brine (50 ml), dried over sodium sulphate. The organic layer was filtered and concentrated in vacuo to afford a crude compound. This residue was purified by combi-lash ($R_f$200, Teledyne/Isco) instrument onto a redisep $R_f$ column with gradient elution (0 to 8%) methanol in dichloromethane to furnish the title compound (4.05 g, 70.1%) as an off white solid. $^1$H NMR (400 MHz, DMSO-d6) δ 8.17 (d, J=0.7 Hz, 1H), 8.05 (s, 1H), 7.26 (s, 1H), 7.05 (dd, J=11.1, 1.4 Hz, 1H), 6.97 (d, J=7.0 Hz, 4H), 6.41 (d, J=3.5 Hz, 1H), 6.35 (d, J=3.5 Hz, 1H), 5.53 (d, J=14.5 Hz, 2H), 5.30 (d, J=5.7 Hz, 1H), 4.37 (d, J=5.7 Hz, 1H), 3.02 (h, J=6.8 Hz, 2H), 2.73-2.58 (m, 2H), 1.37 (s, 3H), 1.27 (s, 3H); LCMS m/z=495.05 (M−).

(1S,2R,5R)-3-(2-(2-Amino-3-chloro-5-fluoroquinolin-7-yl)ethyl)-5-(4-amino-7H-pyrrolo[2,3-d]pyrimidin-7-yl)cyclopent-3-ene-1,2-diol (Compound-24)

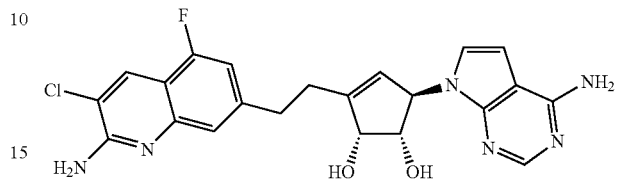

A mixture of 7-(2-((3aS,4R,6aR)-4-(4-amino-7H-pyrrolo[2,3-d]pyrimidin-7-yl)-2,2-dimethyl-3a,6a-dihydro-4H-cyclopenta[d][1,3]dioxol-6-yl)ethyl)-3-chloro-5-fluoroquinolin-2-amine (4.05 g, 8.18 mmol) and TPA (26.5 ml, 344 mmol) was stirred at 0° C. for 15 min under $N_2$ atmosphere. The resulting mixture was stirred at room temperature for 12 h. The reaction mixture was basified with ice cold solution of sodium bicarbonate and extracted with ethyl acetate (100 ml). Layers were separated, an organic layer was washed with brine (50 ml) and dried over anhydrous $Na_2SO_4$. The organic layer was filtered and concentrated in vacuo to give a crude compound. This residue was purified by combi-flash ($R_f$200, Teledyne/Isco) instrument onto a redisep $R_f$ column with gradient elution (0 to 10%) methanol in dichloromethane to furnish 3.6 g of the title compound. This compound was again purified by reverse phase preparative HPLC (YMC Triart C18 50×2.0 mm, 1.9 μm (RFLC-175); Mobile Phase A: Water:$CH_3CN$ (9:1 V/V)+0.05% $NH_4OH$, Mobile Phase A: $CH_3CN$:Water (9:1) (V/V)+0.05% $NH_4OH$; Injection volume: 0.2 μl, Wavelength: 220 nm, Run time: 4.5 min, Flow rate: 0.6 ml/min). The compound obtained alter RP prep HPLC was co-distilled twice with water (12 ml and 5 ml) to provide (2.3 g, 61.8%) of the title compound as an off white solid. $^1$H NMR (400 MHz, DMSO-d6) δ 8.17 (d, J=0.8 Hz, 1H), 8.03 (s, 1H), 7.22 (s, 1H), 7.01 (dd, J=11.0, 1.4 Hz, 1H), 6.95 (s, 2H), 6.92 (s, 2H), 6.63 (d, J=3.5 Hz, 1H), 6.42 (d, J=3.5 Hz, 1H), 5.50 (t, J=3.2 Hz, 1H), 5.45 (t, J=1.7 Hz, 1H), 4.96 (dd, J=6.3, 3.0 Hz, 2H), 4.45 (t, J=5.8 Hz, 1H), 3.97 (q, J=5.5 Hz, 1H), 3.03-2.87 (m, 2H), 2.56 (t, J=7.0 Hz, 2H); LCMS m/z=454.98 (M+).

Example 2—In Vitro Data

Compound-24 ((1S,2R,5R)-3-(2-(2-amino-3-chloro-5-fluoroquinolin-7-yl)ethyl)-5-(4-amino-7H-pyrrolo[2,3-d]pyrimidin-7-yl)cyclopent-3-ene-1,2-diol) was investigated in combination with targeted therapeutic agents in vitro in either cell viability assay assessed by CellTiter-Glo® (CTG) or in a colony forming assay (CFA) assessed by Crystal violet staining or CCK8 assay in various cell lines. Combination studies were carried out in cell lines MDA-MB-231 (Breast cancer, TNBC), MIA PaCa-2 (KRAS-mut pancreatic cancer), OCI-Ly10 (ABC-Diffuse large B-Cell lymphoma) and OCI-Ly3 (ABC-Diffuse large B-cell lymphoma, CARD11 mutant). The cell lines OCI-Ly10 and OCI-Ly3 were both obtained and licensed from University Health Network, Canada.

CTG Assay:

MDA-MB-231 cells were seeded in culture media (DMEM+10% FBS) at a density of 250 cells/well in 96-well white opaque plate followed by overnight incubation under standard cell culture conditions. Next day, cells were treated with Compound-24 and another targeted agent as indicated in the figures. Treatment was repeated on 5$^{th}$ day and assay was terminated on 10$^{th}$ day. Cell viability was assessed at the end of treatment using CellTiter-Glo® reagent as per manufacturer's instructions. Luminescence was measured in BioTek Synergy Neo II plate reader. RLUs (Relative Light Units) are directly proportional to the actively proliferating cell number.

% inhibition=[[(Avg. Vehicle RLU−Avg Blank RLU)−(Avg test RLU−Avg Blank RLU)]×100]/ [((Avg,Vehicle RLU−Avg Blank RLU)]

Note: Blank contains only CTG and media (no cells)

OCI-Ly3 cells were seeded in culture media (RPMI+10%, FBS) at a density of 2000 cells/well in 96-well white opaque plate. Treatment was initiated on the same day and cells were treated for 4 days. Cell viability was assessed at the end of treatment using CellTiter-Glo® reagent as per manufacturer's instructions. Luminescence was measured in BioTek Synergy Neo II plate reader. Effect on cell viability was assessed for Compound-24 in combination with MALT1 inhibitor.

CCK-8 Assay:

OCI-Ly-10 cells were seeded in culture media (IMDM+ 20% FBS) at a density of 2000 cells/well in 96-well transparent plate, were treated with various concentrations of test compounds. Treatment was initiated on the same day and cells were treated for 7 days. Cell viability was assessed using CCK-8 kit (Dojindo Laboratories, China) as per manufacturer's instructions. Plates were read in calorimeter and absorbance was detected. (Detection at 450 nm; Background correction at 650 nm). Effect on cell viability was assessed for Compound-24 in combination with MALT1 inhibitor or in combination with BTK inhibitor Ibrutinib.

inhibition(Background subtracted)=[(Avg. Vehicle Control OD−Avg. test OD)×100)/(Avg. Vehicle Control OD]

Colony Forming Assay:

MIA PaCa-2 cells were seeded at a density of 5000 cells/well in a 6-well plate or 500 cells/well in a 48-well plate followed by overnight incubation under standard cell culture conditions. Next day, cells were treated with Compound-24 and another targeted agent as indicated in the figures. After 7 days of drug treatment, media was removed from each well and plates were washed with PBS. Colonies were stained with crystal violet solution for 2-5 min. Plate was then washed carefully under tap water and air dried. For quantitation, 1000 µL destaining solution containing 10% Glacial acetic acid was added to each well and crystal violet from the colonies was allowed to solubilize for 20-30 min on plate shaker. After solubilization, absorbance of the extracted stain was recorded in BioTek Synergy Neo II plate reader at 590 nm. Absorbance values were directly proportional to colony growth.

% inhibition=[[(Avg. Vehicle abs−Avg Blank abs)− (Avg test abs−Avg Blank abs)]×100]/[(Avg. Vehicle abs−Avg Blank abs)]

Note: Blank contains only destaining solution

As shown in FIGS. 1-7, and further discussed in the "In vivo Data" section below, the combination of Compound-24 with various targeted agents (e.g., EGFR inhibitors, SOS1 inhibitors, ERK inhibitors, PARP inhibitors, KRAS-G12C inhibitor or CDK4/6 inhibitors) demonstrated a synergistic or enhanced inhibition of cell viability as compared to either agent alone.

In-Vivo Data

Example 3

Compound-24 was combined with the EGFR inhibitor Afatinib in an in vivo efficacy study in MIA PaCa-2 human pancreatic cancer xenograft model in nude mice. 20×10$^6$ MIA PaCa-2 cells were injected subcutaneously in the presence of PBS and matrigel in 1:1 ratio in nude mice. The tumor-bearing mice were randomized once the tumors reached an average volume of approximately 177-178 mm$^3$ (Tumor volume range 119-232 mm$^3$). The mice were divided into the following groups (n=9-10/group): Vehicle control, Compound-24 (1 mg/kg; b.i.d.), Afatinib (12.5 mg/kg; q.d.) and Compound-24+Afatinib (Compound-24; 1 mg/kg; b.i.d+Afatinib; 12.5 mg/kg; q.d.). Compound-24 and Afatinib alone showed % tumor growth inhibition of 48.03±5.75 and 58.68±5.14 respectively, whereas the combination of Compound 24 and Afatinib led to 84.16±1.88% tumor growth inhibition.

Figure 8:
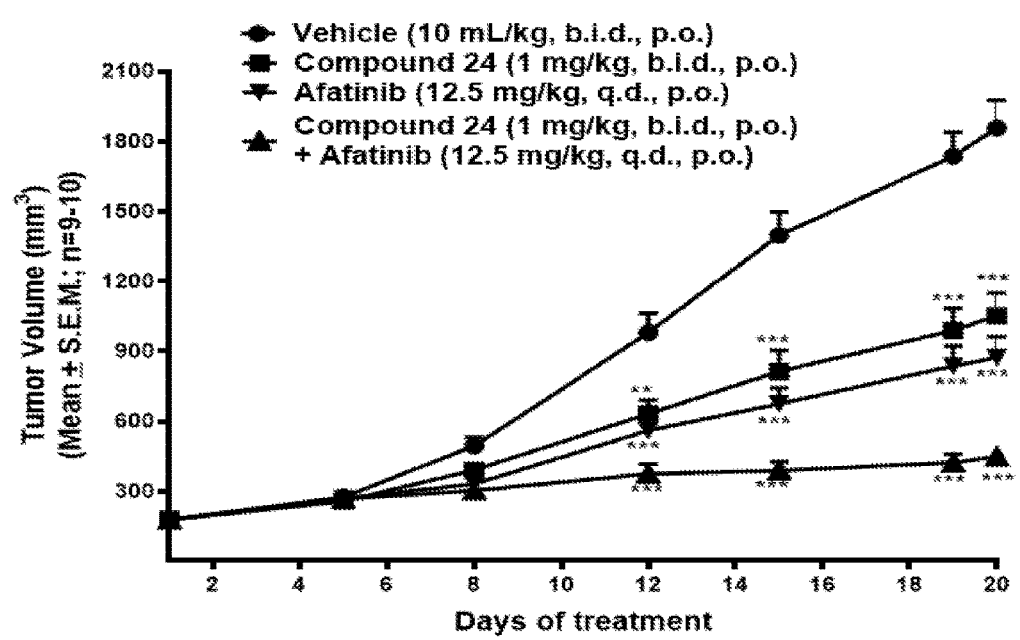
FIG. 8 presents a line graph showing the in vivo efficacy of the combination of a representative combination of the invention, Compound-24 with EGFR inhibitor Afatinib in MIA PaCa-2 xenografts.

Further, FIG. 8 shows the surprising in vivo efficacy of Compound-24 with EGFR inhibitor Afatinib in MIA PaCa-2 xenografts.

Example 4

Compound-24 was combined with the SOS1 inhibitor BI-3406 in an in vivo efficacy study in MIA PaCa-2 human pancreatic cancer xenograft model in nude mice, 20×10$^6$ MIA PaCa-2 cells were injected subcutaneously in the presence of PBS and matrigel in 1:1 ratio in nude mice. The tumor-bearing mice were randomized once the tumors reached an average volume of approximately 155-159 mm$^3$ (Tumor volume range 107-248 mm$^3$). The mice were divided into the following groups (n=7-8/group): Vehicle control, Compound 24 (1 mg/kg; BI-3406 (50 mg/kg; b.i.d.) and Compound-24+BI-3406 (Compound-24; 1 mg/kg; b.i.d+BI-3406; 50 mg/kg; b.i.d.). Compound-24 and BI-3406 alone showed % tumor growth inhibition of 47.88±12.12 and 47.97±11.91 respectively on day 15, whereas the combination of Compound-24 and BI-3406 led to 85.98±6.79% tumor growth inhibition on day 15.

Figure 9:
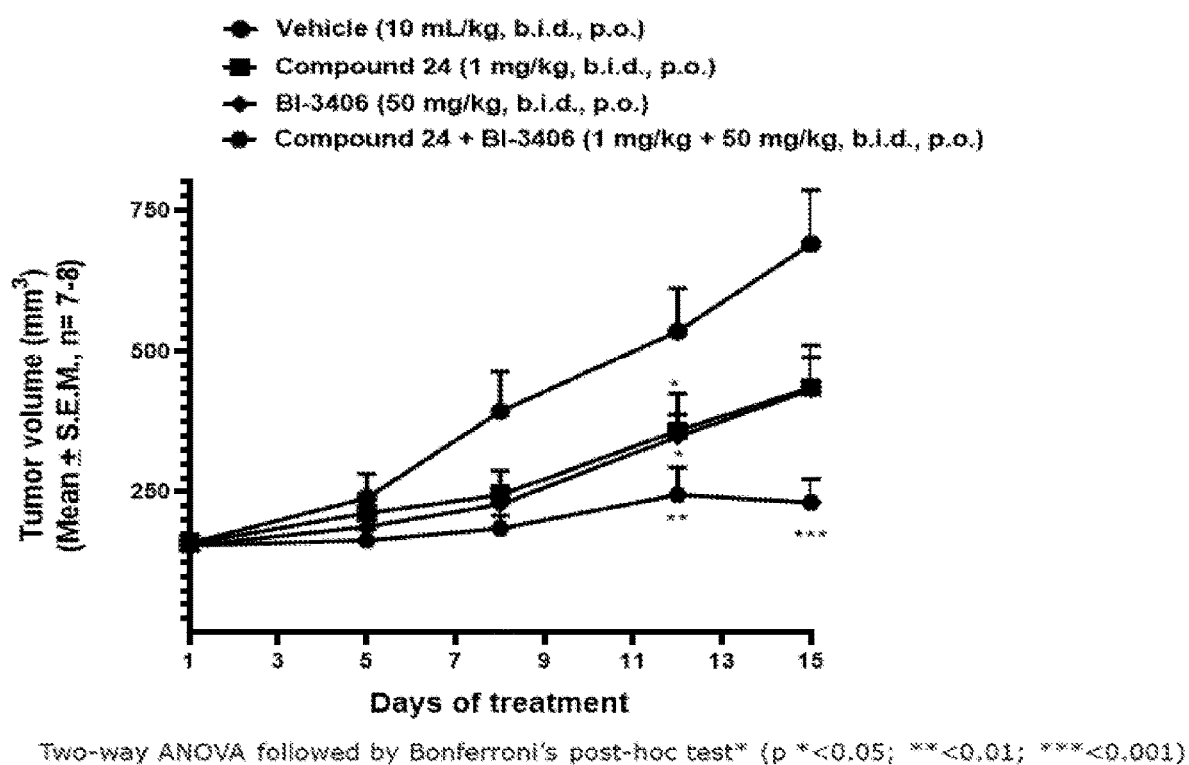
FIG. 9 presents a line graph showing the in vivo efficacy of a representative combination of the invention, the combination of Compound-24 with SOS1 inhibitor BI-3406, in MIA PaCa-2 xenografts.

Further, FIG. 9 shows the surprising in vivo efficacy of Compound-24 with SOS1 inhibitor BI-3406, in MIA PaCa-2 xenografts.

Example 5

Compound-24 was combined with the ERK inhibitor Ulixertinib (BVD-523) in an in vivo efficacy study in MIA PaCa-2 human pancreatic cancer xenograft model in nude mice.

MIA PaCa-2 tumor fragments were implanted subcutaneously in nude mice. The tumor-bearing mice were randomized once the tumors reached an average volume of approximately 181-183 mm$^3$ (Tumor volume range 54-314 mm$^3$). The mice were divided into the following groups (n=8-10/group): Vehicle control, Compound-24 (1 mg/kg; b.i.d.), BVD-523 (25 mg/kg; b.i.d.) and Compound-24+ BVD-523 (Compound-24; 1 mg/kg; b.i.d+BVD-523; 25 mg/kg; b.i.d.). Compound-24 and BVD-523 alone showed % tumor growth inhibition of 58.83±9.92 and 37.4819.58 respectively, whereas the combination of Compound-24 and BVD-523 led to 88.0516.77% tumor growth inhibition.

Figure 10:
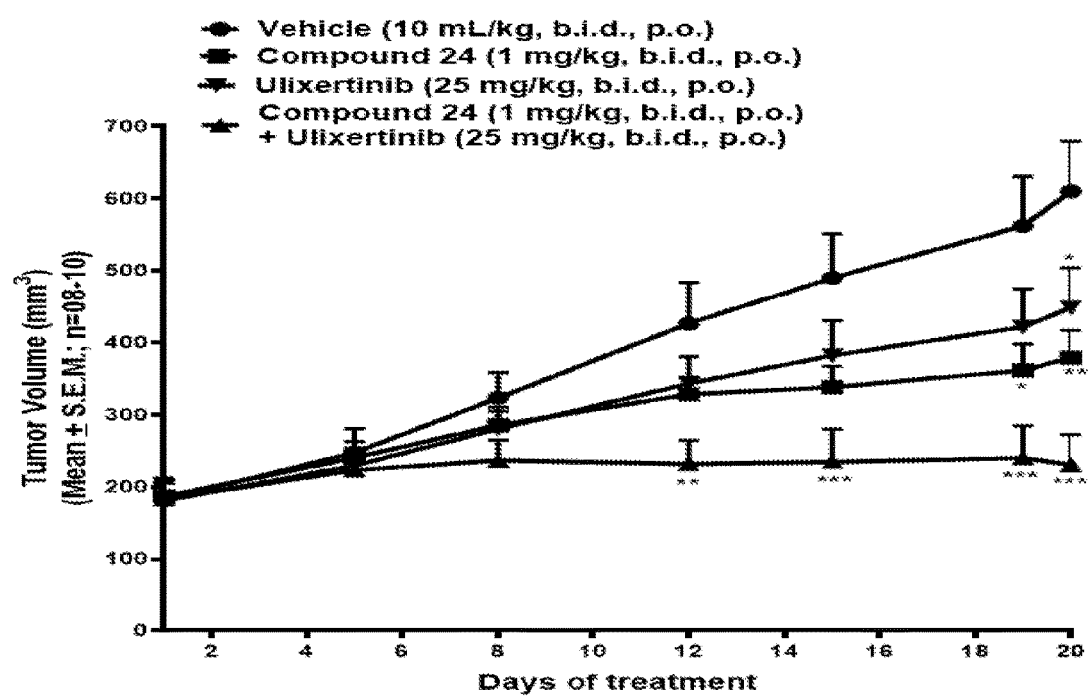
FIG. 10 presents a line graph showing the in vivo efficacy of a representative combination of the invention, the combination of Compound-24 with ERIC inhibitor Ulixertinib (BVD-523), in MIA PaCa-2 xenografts.

Further, FIG. 10 shows the surprising in vivo efficacy of Compound-24 with ERK inhibitor Ulixertinib (BVD-523) in MIA PaCa-2 xenografts.

It will be understood that the foregoing description is of exemplary embodiments of this invention, and that the invention is not limited to the specific forms shown. Modifications may be made in the design and arrangement of the elements.

The inventions described and claimed herein have many attributes and embodiments including, but not limited to, those set forth or described or referenced in this Detailed Description. It is not intended to be all-inclusive and the inventions described and claimed herein are not limited to or by the features or embodiments identified in this Detailed Description, which is included for purposes of illustration only and not restriction. A person having ordinary skill in the art will readily recognize that many of the components and parameters may be varied or modified to a certain extent or substituted for known equivalents without departing from the scope of the invention. It should be appreciated that such modifications and equivalents are herein incorporated as if individually set forth. The invention also includes all of the steps, features, compositions and compounds referred to or indicated in this specification, individually or collectively, and any and all combinations of any two or more of said steps or features.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Applicants reserve the right to physically incorporate into this specification any and all materials and information from any such patents, publications, scientific articles, web sites, electronically available information, and other referenced materials or documents. Reference to any applications, patents and publications in this specification is not, and should not be taken as, an acknowledgment or any form of suggestion that they constitute valid prior art or form part of the common general knowledge in any country in the world.

The specific methods and compositions described herein are representative of preferred embodiments and are exemplary and not intended as limitations on the scope of the invention. Other objects, embodiments, and embodiments will occur to those skilled in the art upon consideration of this specification and areas defined by the scope of the claims. It will be readily apparent to one skilled in the art that varying substitutions and modifications may be made to the invention disclosed herein. The invention illustratively described herein suitably may be practiced in the absence of any element or elements, or limitation or limitations, which is not specifically disclosed herein as essential. Thus, for example, in each instance herein, in embodiments or examples of this, any of the terms "comprising", "consisting essentially of", and "consisting of" may be replaced with either of the other two terms in the specification. Also, the terms "comprising", "including", containing", etc. are to be read expansively and without limitation. The methods and processes illustratively described herein suitably may be practiced in differing orders of steps, and that they are not necessarily restricted to the orders of steps indicated herein or in the claims. It is also that as used herein and in the appended claims, the singular forms "a," "an," and "the" include plural reference unless the context clearly dictates otherwise. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants. Furthermore, titles, headings, or the like are provided to enhance the reader's comprehension of this document, and should not be read as limiting the scope of this. Any examples of embodiments, embodiments or components of the invention referred to herein are to be considered non-limiting.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although this has been specifically disclosed by preferred embodiments and optional features, modification and variation of the concepts herein disclosed may be resorted to by those skilled in the art, and that such modifications and variations are considered to be within the scope of this invention as defined by the appended claims.

The invention has been described broadly and generically herein. Each of the narrower species and subgeneric groupings falling within the generic disclosure also form part of the invention. This includes the generic description of the invention with a proviso or negative limitation removing any patient matter from the genus, regardless of whether or not the excised material is specifically recited herein.

Other embodiments are within the following claims. In addition, where features or embodiments of the invention are described in terms of Markush groups, those skilled in the art will recognize that the invention is also thereby described in terms of any individual member or subgroup of members of the Markush group.

The invention claimed is:

1. A synergistic pharmaceutical combination selected from:
   (a) compound (1S,2R,5R)-3-(2-(2-amino-3-chloro-5-fluoroquinolin-7-yl)ethyl)-5-(4-amino-7H-pyrrolo[2,3-d]pyrimidin-7-yl)cyclopent-3-ene-1,2-diol (Compound-24) or a pharmaceutically acceptable salt thereof, and Afatinib,
   (b) compound (1S,2R,5R)-3-(2-(2-amino-3-chloro-5-fluoroquinolin-7-yl)ethyl)-5-(4-amino-7H-pyrrolo[2,3-d]pyrimidin-7-yl)cyclopent-3-ene-1,2-diol (Compound-24) or a pharmaceutically acceptable salt thereof, and BI-3406, and
   (c) compound (1S,2R,5R)-3-(2-(2-amino-3-chloro-5-fluoroquinolin-7-yl)ethyl)-5-(4-amino-7H-pyrrolo[2,3-d]pyrimidin-7-yl)cyclopent-3-ene-1,2-diol (Compound-24) or a pharmaceutically acceptable salt thereof, and Ulixertinib.

2. A method for treating and preventing cancer in a human subject in need thereof comprising administering the synergistic pharmaceutical combination of claim 1 to the subject.

3. The method according to claim 2, wherein the cancer is glioblastoma multiforme, prostate cancer, pancreatic cancer, mantle cell lymphoma, non-Hodgkin's lymphomas and diffuse large B-cell lymphoma, acute myeloid leukemia, acute lymphoblastic leukemia, multiple myeloma, non-small cell lung cancer, small cell lung cancer, breast cancer, triple negative breast cancer, gastric cancer, colorectal cancer, ovarian cancer, bladder cancer, hepatocellular cancer, melanoma, sarcoma, oropharyngeal squamous cell carcinoma, chronic myelogenous leukemia, epidermal squamous cell carcinoma, nasopharyngeal carcinoma, neuroblastoma, endometrial carcinoma, head and neck cancer, or cervical cancer.

* * * * *